(12) United States Patent
Jakubowski et al.

(10) Patent No.: US 8,037,649 B2
(45) Date of Patent: Oct. 18, 2011

(54) PORTABLE STEPS

(75) Inventors: Chris Jakubowski, Rutland Town, VT (US); Scott S. Jakubowski, Castleton, VT (US); Todd M. Jakubowski, Rutland, VT (US); Guang-Sheng Lin, Guangdong (CN)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 351 days.

(21) Appl. No.: 12/056,944

(22) Filed: Mar. 27, 2008

(65) Prior Publication Data
US 2008/0257280 A1    Oct. 23, 2008

Related U.S. Application Data

(60) Provisional application No. 60/908,772, filed on Mar. 29, 2007.

(51) Int. Cl.
*E04F 11/02* (2006.01)
(52) U.S. Cl. ......... 52/182; 52/191; 52/286; 52/DIG. 13; D25/63; 403/361
(58) Field of Classification Search ............... 52/177, 52/179, 180, 181, 182, 183, 184, 185, 186, 52/187, 191, 286, 284, 589, 589.1, 747.1, 52/741.2, 789, DIG. 13; D30/160, 119; D21/494; 108/180, 153.1; D25/63; 446/128, 476, 446/478; 482/52; 403/280, 282, 361
See application file for complete search history.

(56) References Cited

U.S. PATENT DOCUMENTS

| | | | | |
|---|---|---|---|---|
| 815,840 | A * | 3/1906 | Knaus | 52/191 |
| 3,074,292 | A * | 1/1963 | Polmon | 74/553 |
| 3,311,996 | A * | 4/1967 | Bergener | 434/207 |
| 3,393,481 | A * | 7/1968 | Meuret | 52/188 |
| 3,500,606 | A * | 3/1970 | Wharmby | 52/591.1 |
| 3,530,954 | A * | 9/1970 | Schmidt | 182/33 |
| 3,564,790 | A * | 2/1971 | Rehfeld | 52/183 |
| 3,667,787 | A * | 6/1972 | Semour | 403/361 |
| 3,672,708 | A * | 6/1972 | Zemberry | 285/315 |
| 4,008,548 | A * | 2/1977 | Leclerc | 52/180 |
| 4,093,389 | A * | 6/1978 | Wibrow | 403/280 |
| 4,727,704 | A * | 3/1988 | Carlton | 52/667 |

(Continued)

FOREIGN PATENT DOCUMENTS
JP   05044316 A * 2/1993

OTHER PUBLICATIONS

The Orvis Company Inc., Holiday 2005 Dog Catalog,The Orvis Company Inc.,Holiday 2005, coverpage and p. 25.*

*Primary Examiner* — Brian Glessner
*Assistant Examiner* — Joseph J Sadlon
(74) *Attorney, Agent, or Firm* — Volpe And Koenig, P.C.

(57) ABSTRACT

A step assembly that is specifically adapted to assist pets in reaching and/or descending from elevated surfaces is provided. The step assembly has two sidewalls having a plurality of openings in which pegs formed on the sides of individual treads and risers are engaged. The pegs are removably insertable into the openings and include protrusions which create an interference fit upon insertion. Because the treads, risers and side walls are joined by interlocking pegs and openings, the step assembly can be flat packed for shipping, and is easily assembled and disassembled for transportation and/or cleaning.

17 Claims, 31 Drawing Sheets

U.S. PATENT DOCUMENTS

| | | | |
|---|---|---|---|
| 4,997,061 A * | 3/1991 | Aymes | 182/106 |
| 5,094,505 A * | 3/1992 | Nichols | 297/118 |
| 5,201,545 A * | 4/1993 | Boersma | 280/777 |
| 5,244,291 A * | 9/1993 | Confer | 403/374.2 |
| 5,378,076 A * | 1/1995 | D'Andrea | 403/379.4 |
| 5,412,915 A * | 5/1995 | Johnson | 52/177 |
| 5,562,520 A * | 10/1996 | Pridonoff et al. | 446/148 |
| 5,752,350 A * | 5/1998 | Maiuccoro | 52/169.7 |
| 5,832,687 A * | 11/1998 | Willemsen | 52/592.6 |
| 5,878,802 A * | 3/1999 | Richter et al. | 160/135 |
| 6,102,156 A * | 8/2000 | Lipniarski | 182/118 |
| 6,185,878 B1 * | 2/2001 | Bullard et al. | 52/79.5 |
| 6,347,687 B1 * | 2/2002 | Alim | 182/161 |
| 6,415,460 B1 * | 7/2002 | Rossman et al. | 4/572.1 |
| 6,601,271 B1 * | 8/2003 | Williamson et al. | 16/427 |
| 6,769,513 B2 * | 8/2004 | Pettit | 182/115 |
| 6,966,155 B2 * | 11/2005 | Nevison | 52/177 |
| 7,234,780 B2 * | 6/2007 | Lipniarski | 297/461 |
| D548,898 S * | 8/2007 | Northrop et al. | D30/199 |
| D555,845 S * | 11/2007 | Khubani | D30/199 |
| 7,303,801 B2 * | 12/2007 | Kessler | 428/54 |
| 7,578,959 B2 * | 8/2009 | Bahnsen et al. | 264/531 |
| 7,581,357 B2 * | 9/2009 | Richardson et al. | 52/79.5 |
| 7,954,223 B2 * | 6/2011 | Bertolino et al. | 29/505 |
| 2005/0150892 A1 * | 7/2005 | Miller | 220/324 |
| 2005/0249549 A1 * | 11/2005 | Miyahara et al. | 403/275 |
| 2006/0248817 A1 * | 11/2006 | Elwood | 52/182 |
| 2006/0272230 A1 * | 12/2006 | Elwood | 52/182 |
| 2007/0289556 A1 * | 12/2007 | Hoffman et al. | 119/847 |

* cited by examiner

US 8,037,649 B2

PORTABLE STEPS

CROSS REFERENCE TO RELATED APPLICATIONS

This application claims the benefit of U.S. Provisional Application 60/908,772, filed Mar. 29, 2007, which is incorporated herein by reference as if fully set forth.

BACKGROUND

The present invention relates generally to portable steps that are light-weight, easy to assemble and disassemble, flat shippable, and in particular, to portable steps suitable for use by domestic animals in the home, such as small or medium sized dogs, to allow access to various elevated surfaces, for example, a sofa or a bed.

Domestic animals frequently have difficulty moving safely and comfortably between various elevations. Small pets may not be physically able to reach higher elevations because of their overall size. Further, as pets age and develop health problems, they also may have difficulty reaching elevated surfaces that they were once able to reach, such as couches, chairs, sofas, and beds.

When a pet is not able to reach an elevation by themselves because of size or age, they must instead receive assistance from their owners or have access to an assisting structure. Pet owners are not always available, or in some cases, are incapable of lifting a pet to an elevated surface due to physical limitations. Further, lifting a pet is not always desirable as many pets do not like to be held or lifted.

While devices such as ramps and steps are known, they are often heavy or bulky, making them difficult to transport and manipulate once assembled. Alternatively, these devices are not sturdy enough for use by larger pets as well as being generally difficult to assemble and disassemble for transportation or cleaning purposes.

Therefore, it would be desirable to have a stair assembly which was constructed of a light-weight material and could be easily assembled and/or broken down for transportation or cleaning. It would be further desirable to provide a stair assembly that is specifically adapted for use by pets to prevent slipping and allows for comfortable and confident usage.

SUMMARY

The present invention provides a step assembly specifically adapted to assist pets in reaching and/or descending from elevated surfaces. The step assembly has two sidewalls, each having a plurality of openings in which pegs formed on the sides of individual treads and risers are engaged. The pegs are removably insertable into the openings and include protrusions which create an interference fit with the wall of the opening upon insertion. Because the treads, risers and sidewalls are formed from individual pieces joined by interlocking pegs and complementary shaped openings, the step assembly can be flat packed for shipping, and is easily assembled and disassembled for transportation and/or cleaning.

In a preferred embodiment, the sidewalls, treads and risers are preferably formed as blow molded polymeric parts. This provides a light-weight, stable construction that not only reduces shipping costs, but also allows for easier manipulation by a pet owner once assembled. The treads are sloped downwardly and have an anti-slip material attached to the top surface(s) thereof. This not only provides a more ergonomic arrangement for the pet, but also reduces the chance of a pet slipping while negotiating the steps. Further, the anti-slip material is preferably removably attached to allow removal for cleaning or replacement due to wear.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements shown.

DETAILED DESCRIPTION OF THE PREFERRED EMBODIMENTS

Figure 1:
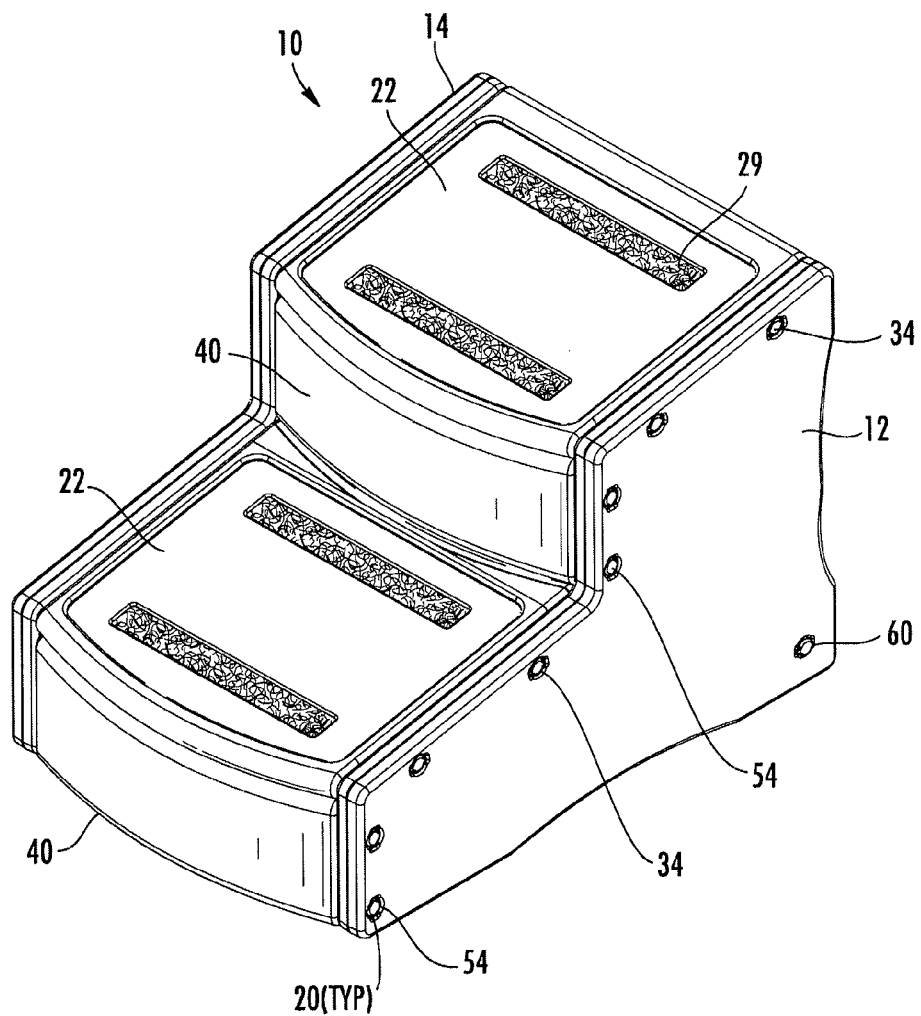
FIG. 1 is a perspective view of a portable step in accordance with a first embodiment of the invention taken from the front-right side.

Certain terminology is used in the following description for convenience only and is not considered limiting. Words such as "front", "back", "top" and "bottom" designate directions in the drawings to which reference is made. This terminology includes the words specifically noted above, derivatives thereof and words of similar import. Additionally, the terms "a" and "one" are defined as including one or more of the referenced item unless specifically noted. In the drawings, "(TYP)" has been used to indicate that an element number is "typical" for all instances of a particular element where more than one of the elements are shown (for example the opening 20 designated as "(TYP)" in FIG. 1).

The preferred embodiments of the present invention will be described with reference to the drawing figures where like numerals represent like elements throughout.

Referring to FIGS. 1-4, a portable step 10 in accordance with the first preferred embodiment of the present invention is shown. As can be seen most clearly in FIGS. 1 and 2, the step 10 includes a right sidewall 12 and a left sidewall 14, each having a plurality of connection openings 20 extending therethrough. Two individual treads 22 and two risers 40 are connected between the sidewalls 12, 14 using pegs 34, 54, respectively, which extend from each side of the treads 22 and risers 40 that engage in the openings 20. Additionally, as shown in detail in FIG. 2, a support bar 60 with pegs 61 is connected between the sidewalls 12 and 14 at the back, bottom corner of each for additional support.

As shown in FIG. 1, preferably the treads 22 are angled downwardly between an angle of approximately 5° and 15°, more preferably between an angle of 8° and 12°, and most preferably at an angle of 10° with respect to horizontal. Additionally, the treads 22 preferably have a depth of approximately twice the height of a riser 40. In the first preferred embodiment, the risers 40 are approximately five inches tall and the treads have a depth of approximately 10 inches or more. This ratio can vary such that the depth of the tread 22 is preferably between 1.5 and 2.5 times a height of the riser 40. Preferably, the risers 40 and treads 22 have a curved profile at the front of each step to allow for easier use.

Referring to FIGS. 6-9, the construction of the tread 22 is shown in detail. The tread 22 is preferably formed from a blow molded polymeric material and includes a top skin 24 and a bottom skin 26. A depression 25 is preferably provided in the top skin 24 for mounting of an anti-slip material 30, such as a piece of carpet, rubber, or any other suitable material. In a preferred embodiment, the anti-slip material 30 is attached through hook and loop type textile fastening strips, such as VELCRO®, with the hook and loop textile fastening strips of one type 29 being located on the top skin 24, preferably in further recesses 33, and opposing hook and loop type textile fastener strips 32 being located on the anti-slip material 30.

The pegs 34 preferably extend from the edge walls 28 on either side of the tread 22. The pegs 34 are preferably constructed with an enlarged cylindrical shoulder 35 adjacent to the base and include an enlarged diameter end section 36 having tabs 37 located at approximately the 3 o'clock and 9 o'clock positions. Preferably, two pegs 34 are provided on each side of the tread 22.

Figure 7:
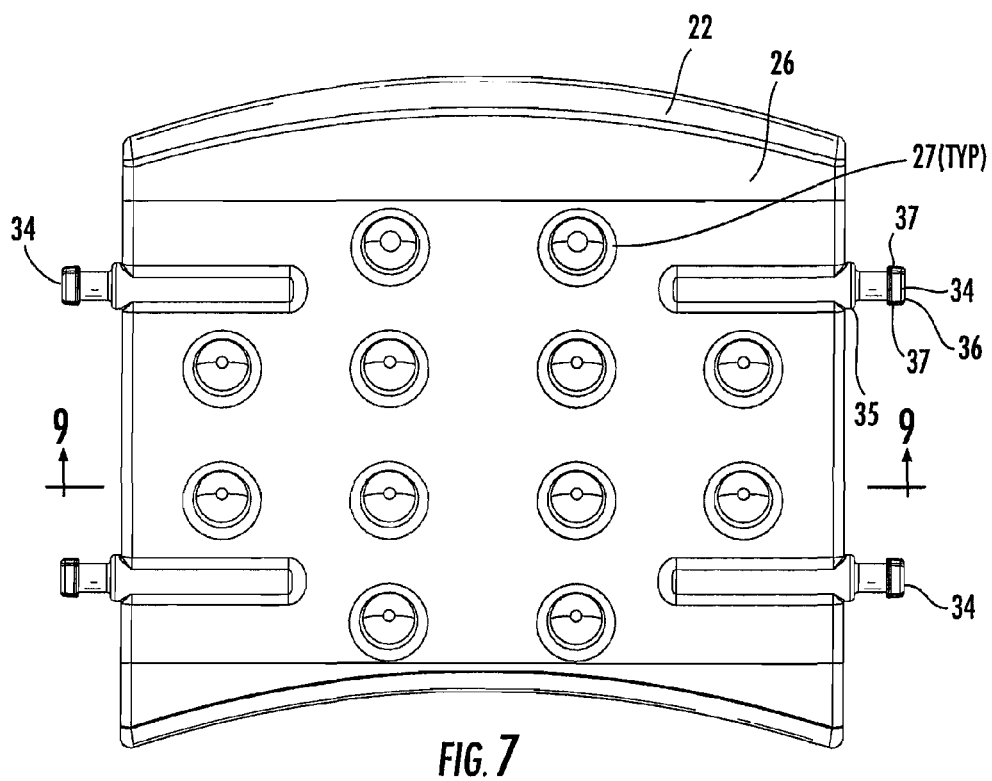
FIG. 7 is a bottom view of the tread of FIG. 6.
Figure 8:
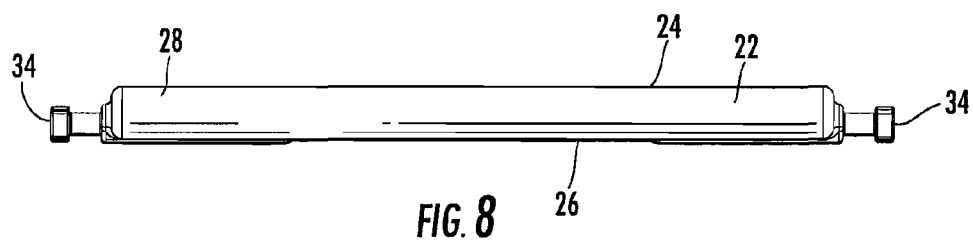
FIG. 8 is a front elevational view of the step of FIG. 6.
Figure 9:
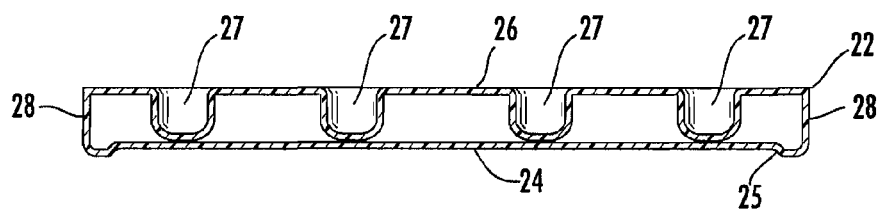
FIG. 9 is a cross-sectional view taken along lines 9-9 in FIG. 7.

Referring to FIGS. 7-9, the bottom skin 26 of the tread 22 preferably includes stiffening depressions 27 located therein. The stiffening depressions 27 provide support for the top skin 24 as shown most clearly in FIG. 9 and provide additional stiffness for the tread 22.

While the preferred embodiment of the tread 22 is preferably blow molded from polypropylene, those skills in the art will recognize that the tread 22 could be formed from other materials and by other means, and that one key feature of the present invention is to provide the releasably engageable pegs 34, preferably having the indicated configuration for assembly of the treads 22 with the sidewalls 12, 14.

Figure 5:
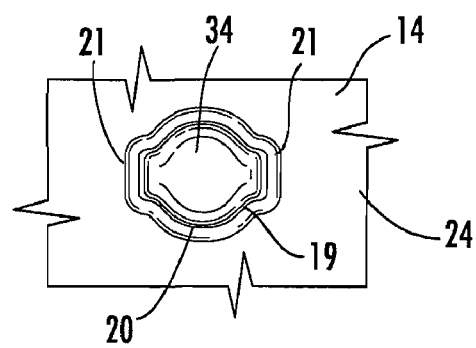
FIG. 5 is an enlarged detail view showing the peg-hole connection utilized in the portable step according to the invention.
Figure 6:
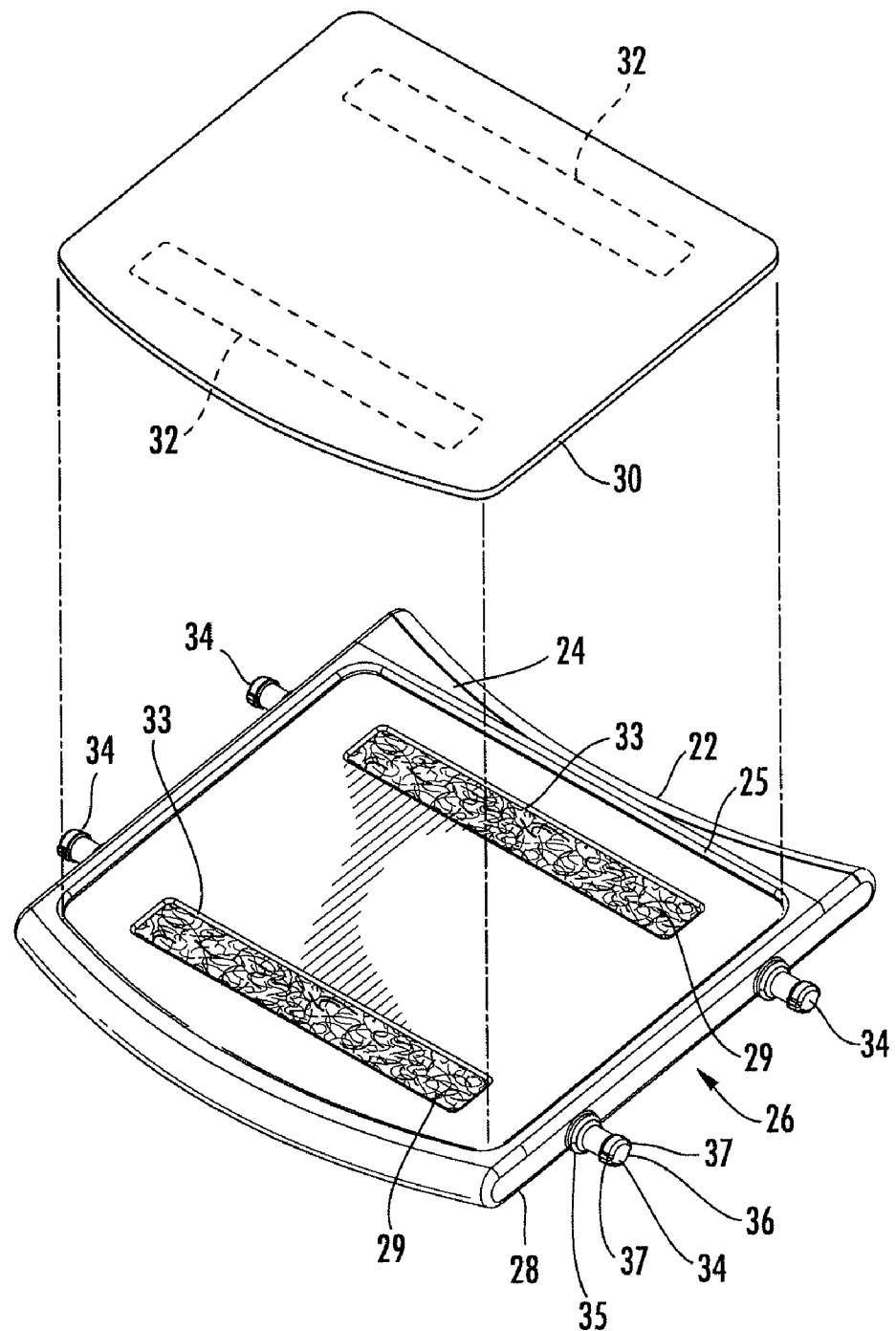
FIG. 6 is an exploded view of the tread used to form the portable step of FIG. 1.
Figure 10:
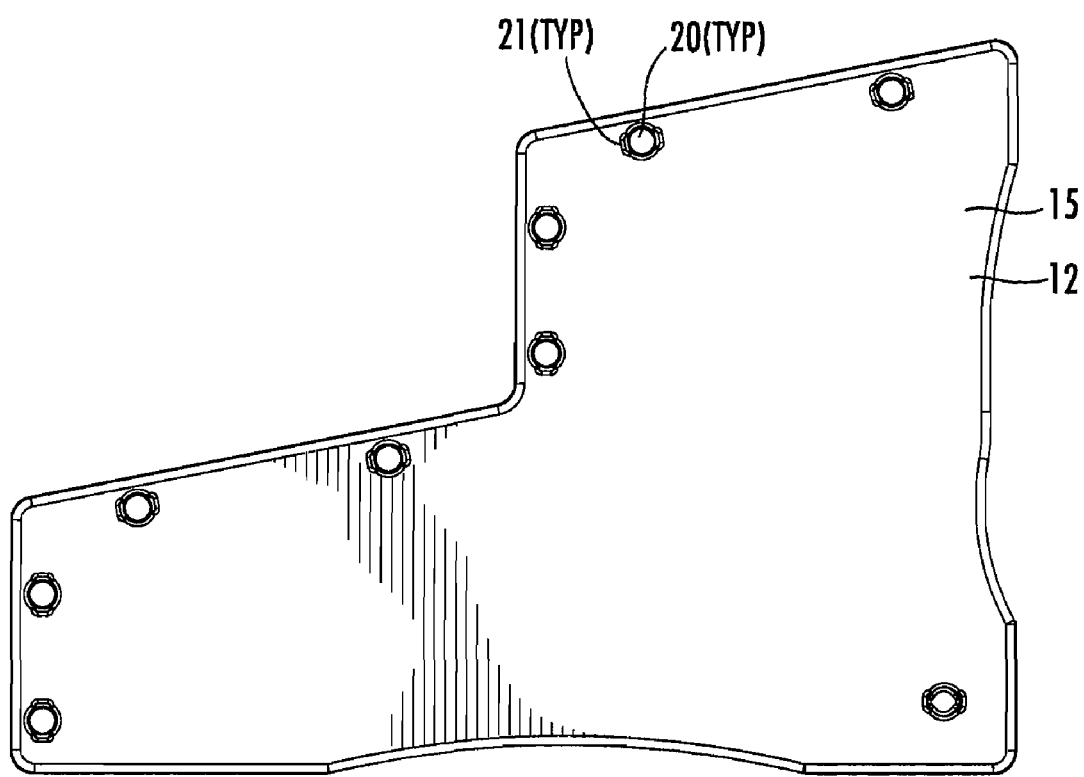
FIG. 10 is a side elevational view of the right sidewall used in the portable step of FIG. 1.
Figure 11:
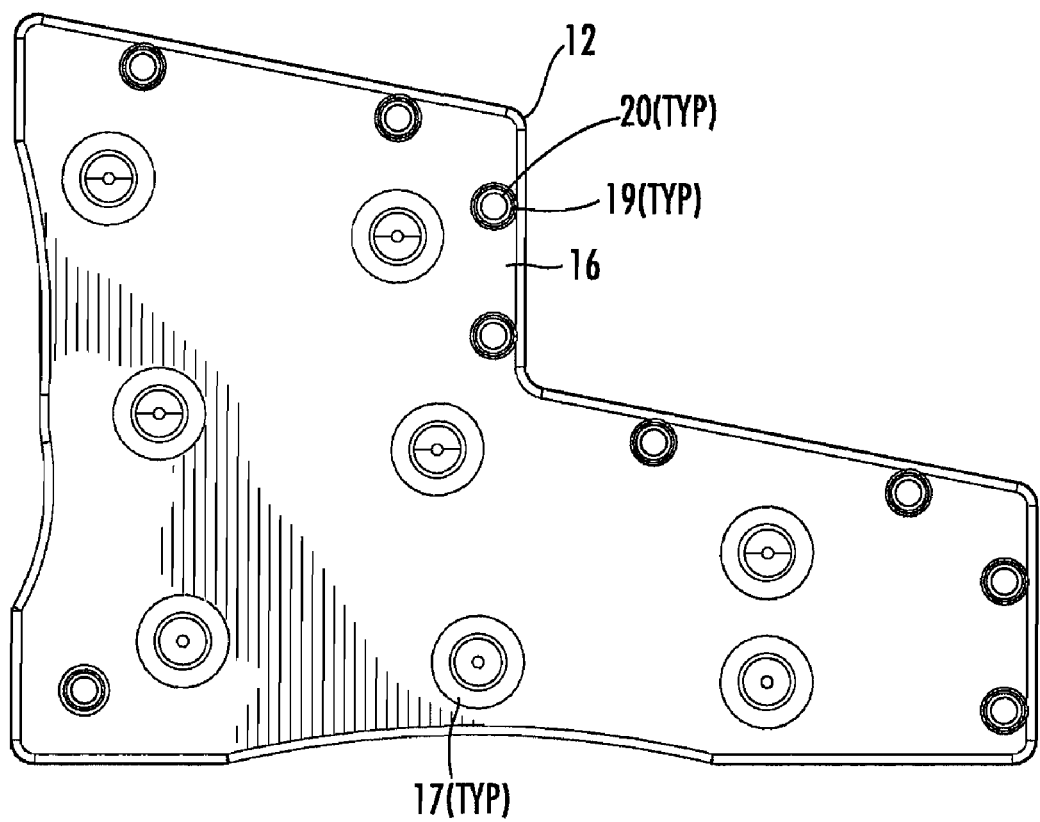
FIG. 11 is an elevational view of the inner skin of the sidewall of FIG. 10.
Figure 12:
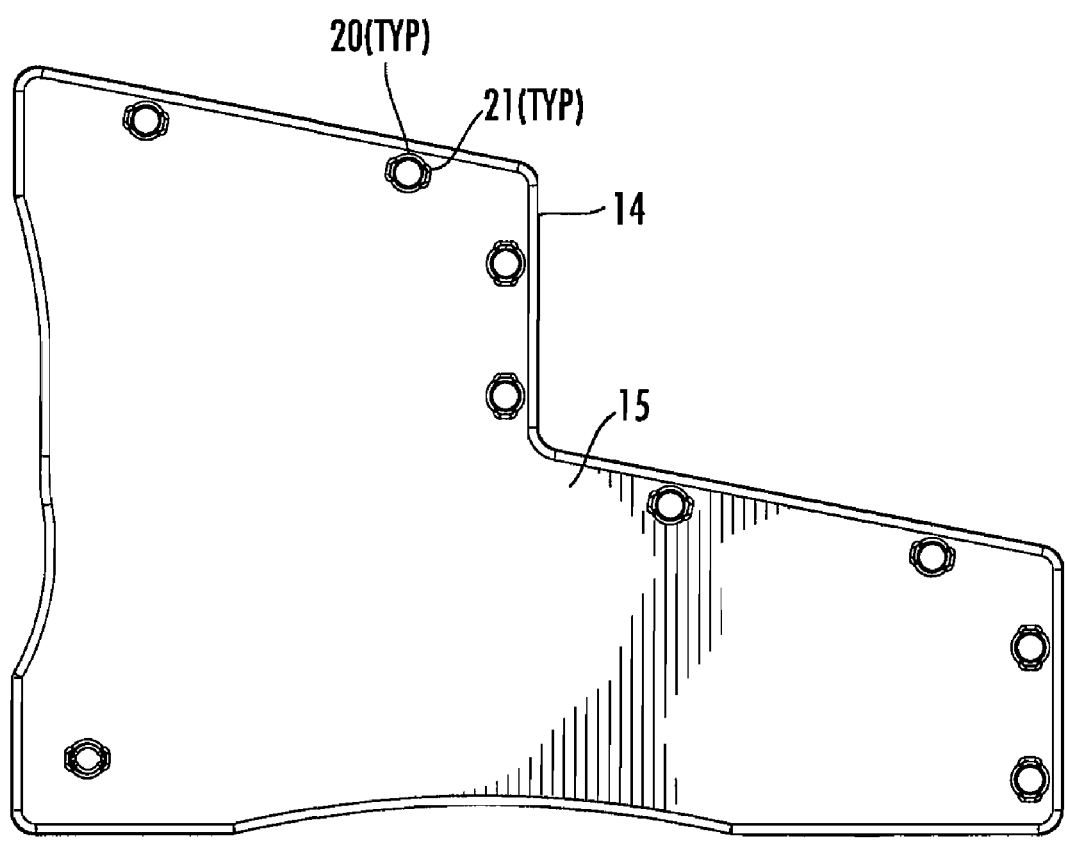
FIG. 12 is an elevational view of the left sidewall used in the portable step of FIG. 1.
Figure 13:
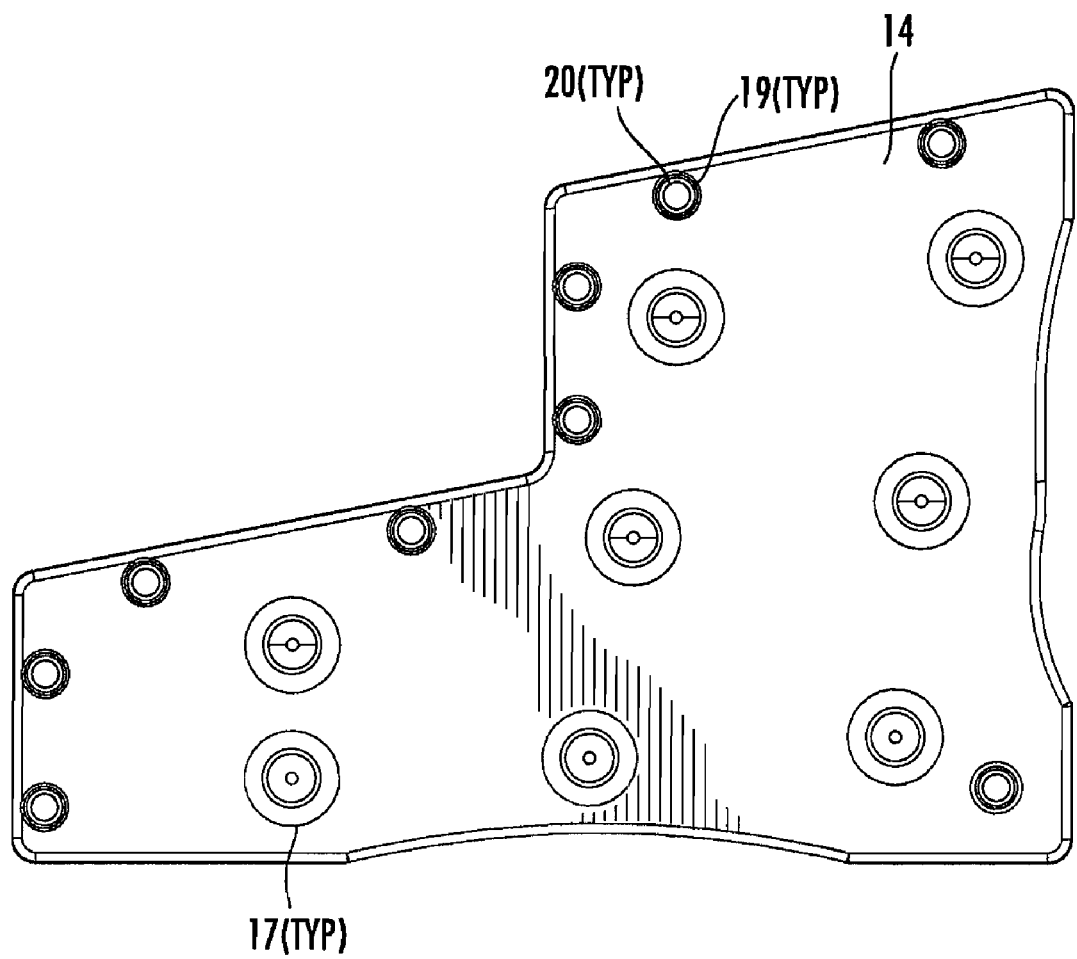
FIG. 13 is an elevational view of the inner skin of the sidewall in FIG. 12.
Figure 14:
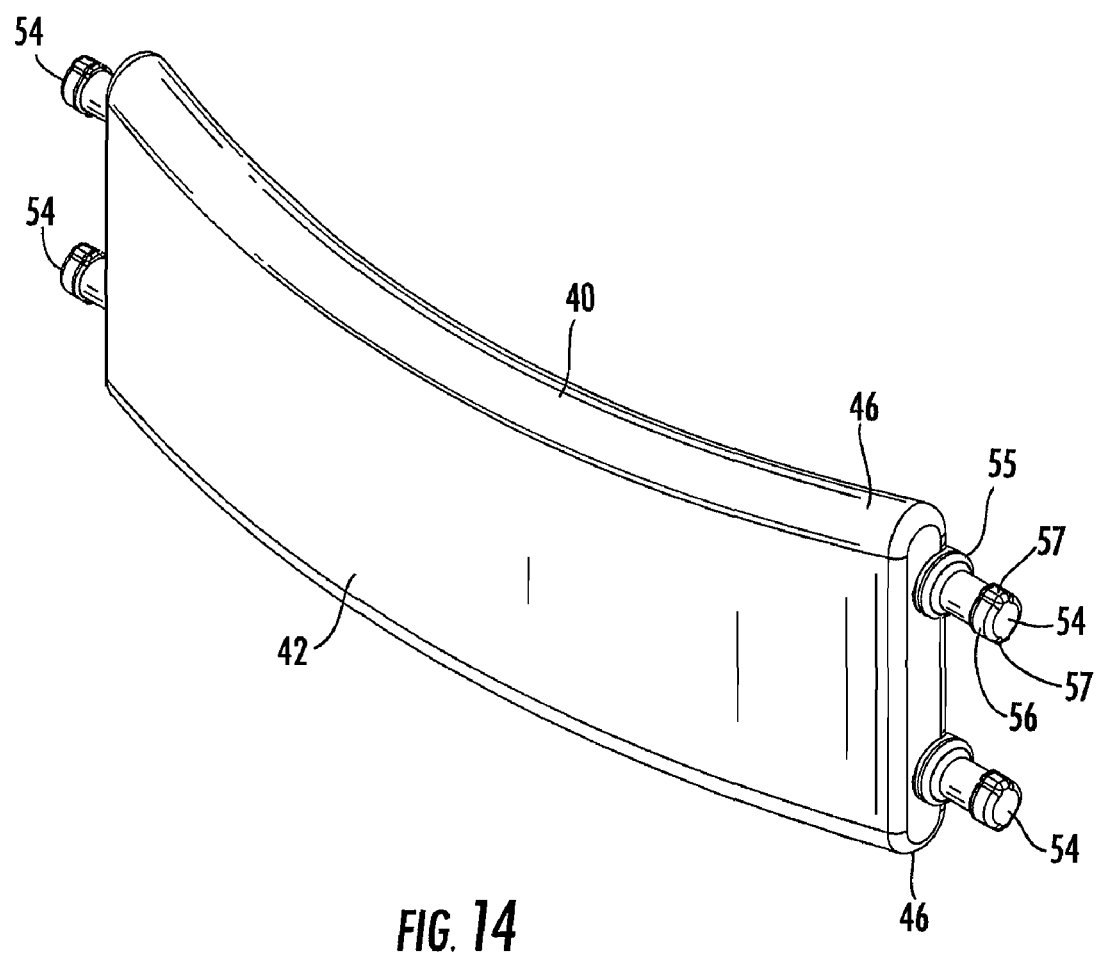
FIG. 14 is a perspective view of a riser used to form the portable step of FIG. 1.
Figure 15:
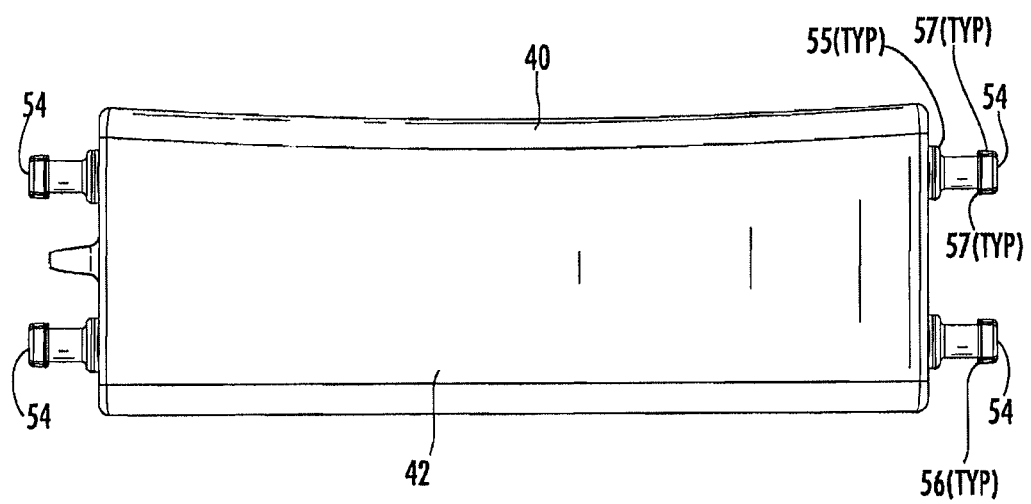
FIG. 15 is a front elevational view of the riser of FIG. 14.
Figure 16:
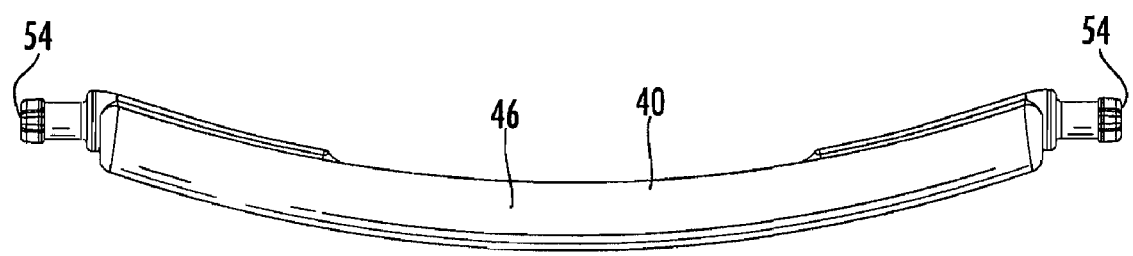
FIG. 16 is a top view of the riser of FIG. 14.
Figure 17:
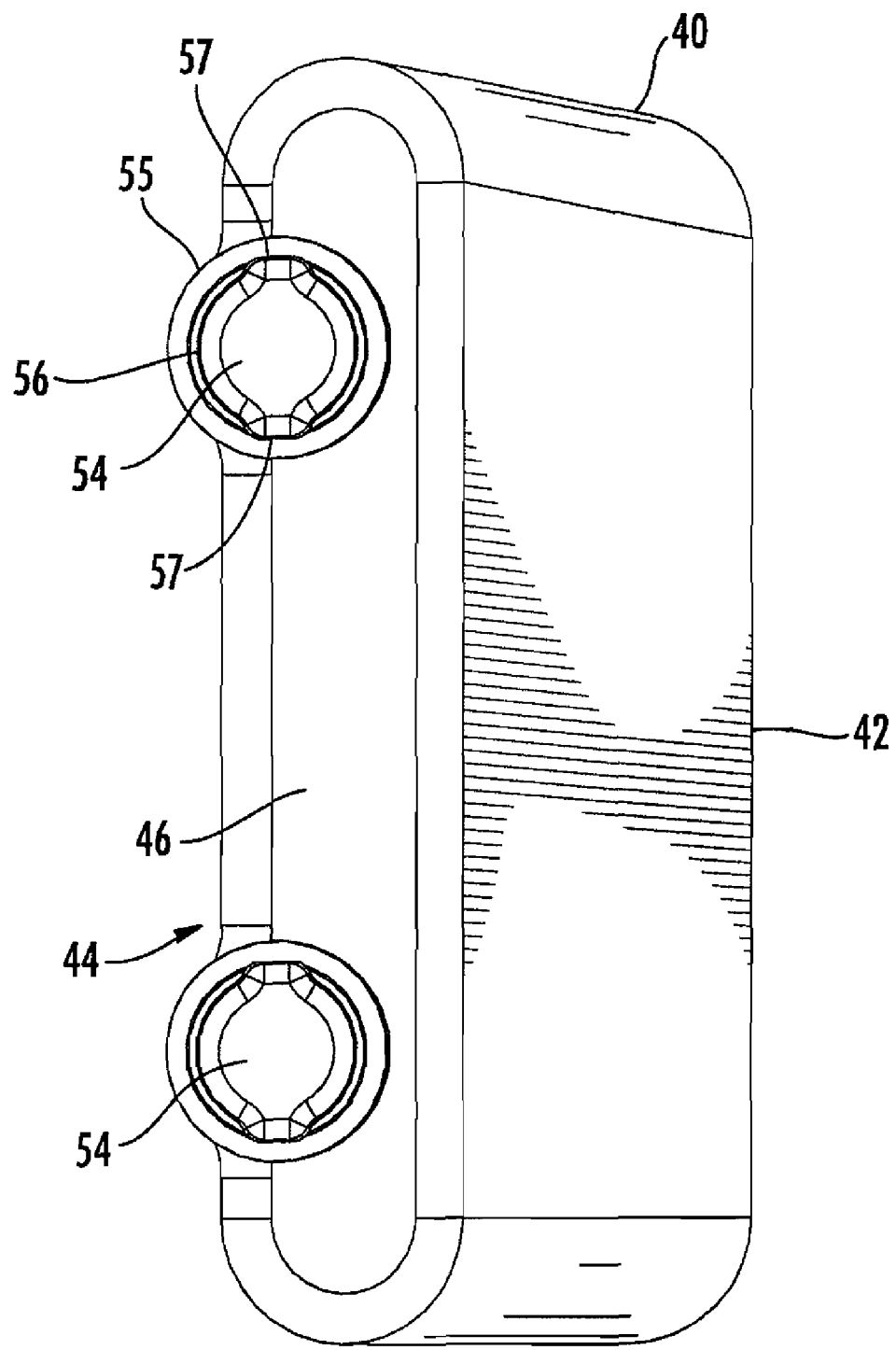
FIG. 17 is an enlarged side view showing the pegs on the ends of the riser of FIG. 14.

Referring to FIGS. 10-13, the sidewalls 12, 14 are shown in detail. The sidewalls 12, 14 each include an outer skin 15 and an inner skin 16. The openings 20 are defined through the outer and inner skins 15, 16 of both sidewalls 12, 14. The openings have a continuous wall that extends between the inner and outer skins 15, 16. As shown in FIGS. 10 and 12, recesses 21 are provided on both sides of the openings 20 in corresponding positions to the tabs 37 of the pegs 34 for a first set of the openings, and in corresponding positions to the tabs 57 of the pegs 54 for a second set of the openings. As shown in FIGS. 11 and 13, each of the openings 20 has a circular shoulder 19 defined therein which corresponds to the shoulder 35 at the base of the pegs 34 of the tread as well as to the shoulders 55 and 62 on the pegs 54 and 61 of the risers 40 and support bar 60, which are described in further detail below. The circular shoulder 19 in the opening 20 preferably provides a snug fit for the pegs 34, 54, 61 so that a good weight transferring connection is provided. Preferably, the pegs 34, 54, 61 can be pressed through the openings 20 and the tabs 37, 57 and 64 can engage behind the shoulder 19 in the openings 20 to hold the treads 22, risers 40 and support bar 60 to the sidewalls 12, 14, as shown in FIG. 5.

The sidewalls 12, 14 are preferably also blow molded from polypropylene, although other materials and/or methods of fabrication can be utilized. The blow molded configuration allows the continuous wall defining the openings 20 between the inner and out skins 15, 16 to flex for assembly and disassembly.

Referring to FIGS. 14-17, one of the risers 40 is shown in detail. The risers 40 are preferably also formed from blow molded polymeric material, preferably polypropylene, and include a front skin 42 and a back skin 44, shown best in FIG. 2, with an edge wall 46 extending between the front skin 42 and back skin 44. Pegs 54, which are similar to the pegs 34 as described above, extend from both sides of the riser 40. The peg 54 includes the circular shoulder 55 located at the base and an enlarged end 56 having tabs 57 located at the 12 o'clock and 6 o'clock positions. The openings 20 in the sidewalls 12 and 14 include corresponding recesses 21, as indicated in detail in FIGS. 10 and 12. The shoulders 55 provide a snug fit with the circular recesses that define the shoulder 19 in the inner skins 16 of the side walls 12 and 14, as discussed above.

Figure 2:
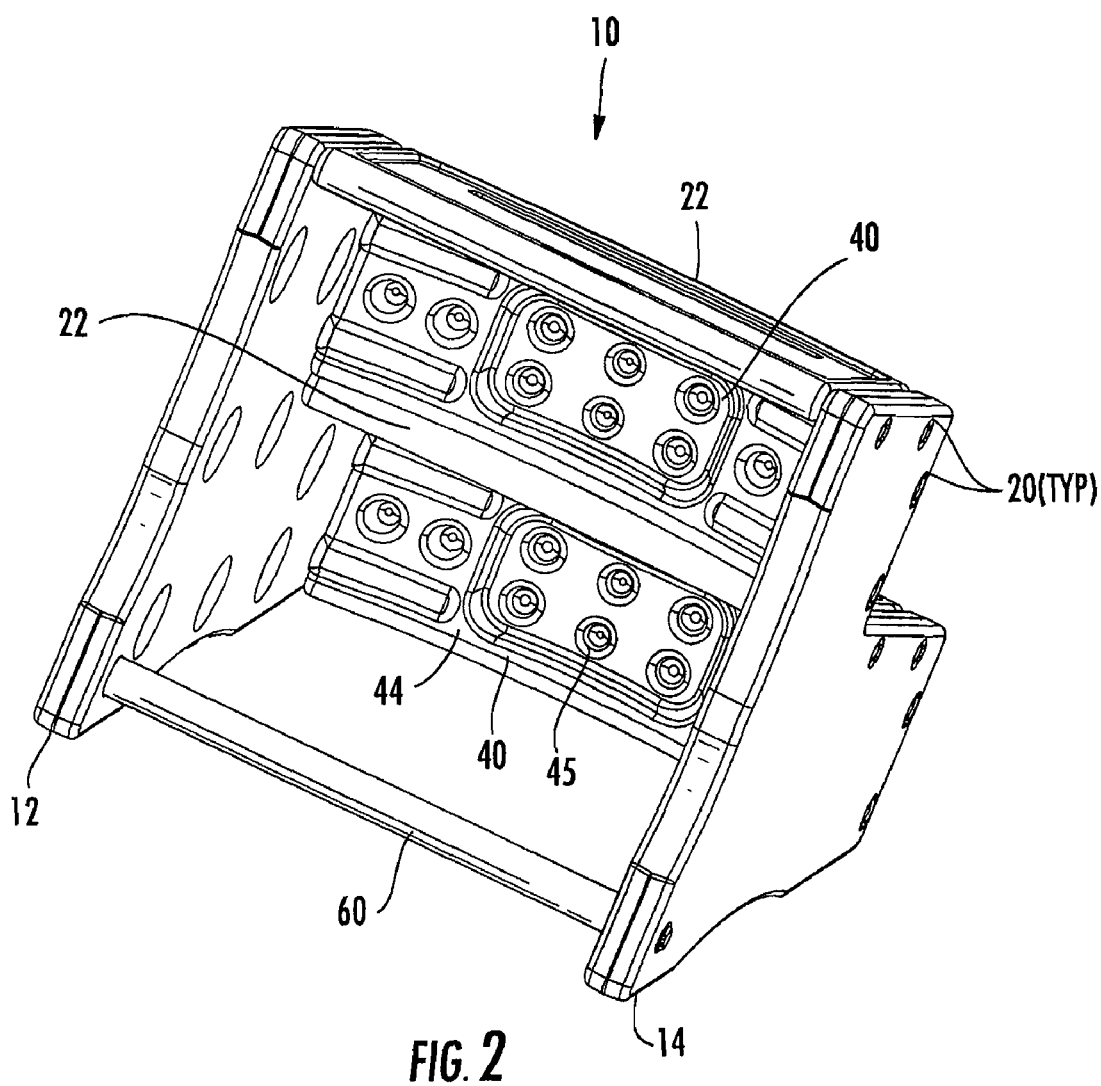
FIG. 2 is a perspective view of the portable step of FIG. 1 taken from the rear-left side.
Figure 3:
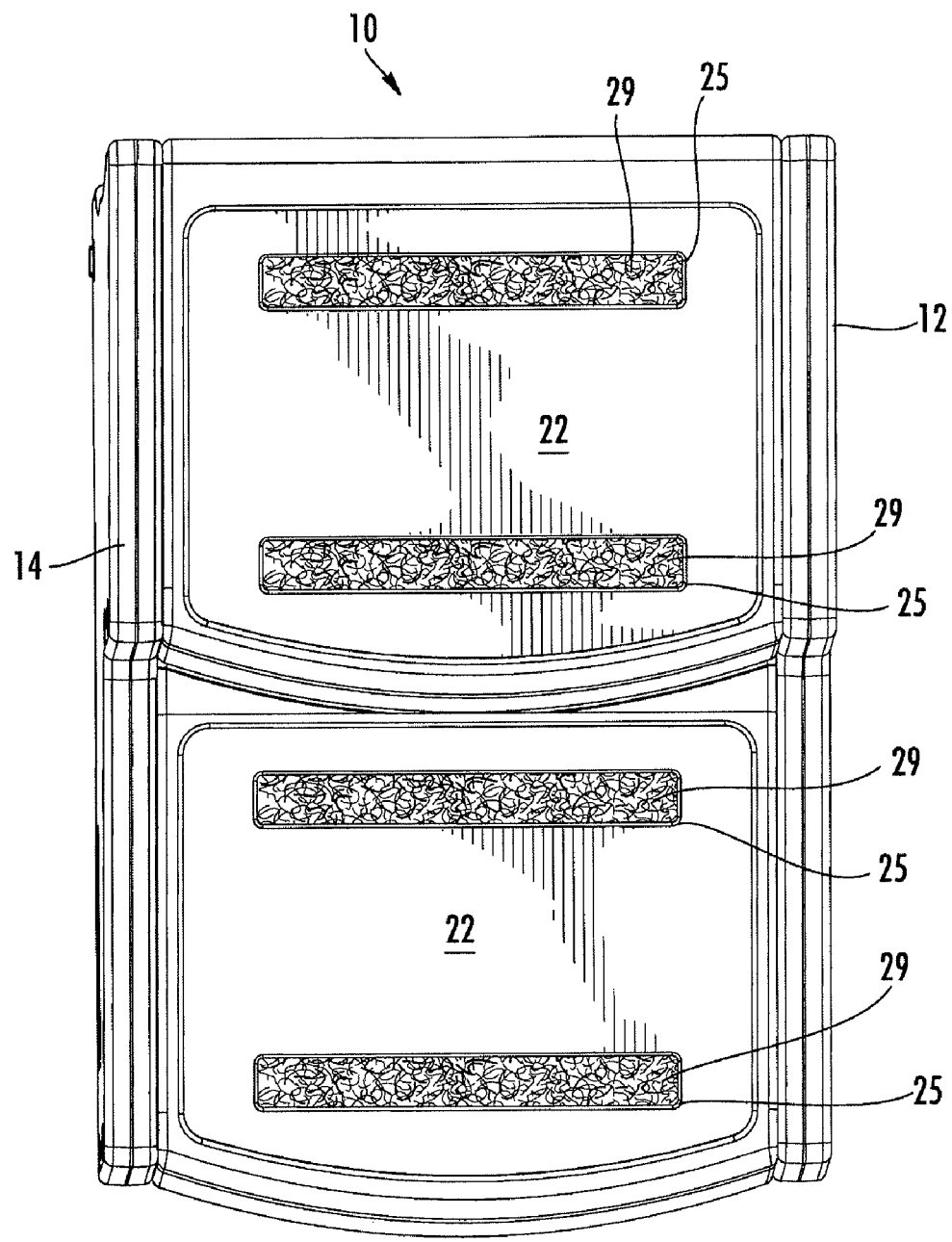
FIG. 3 is a top view of the portable step of FIG. 1.
Figure 4:
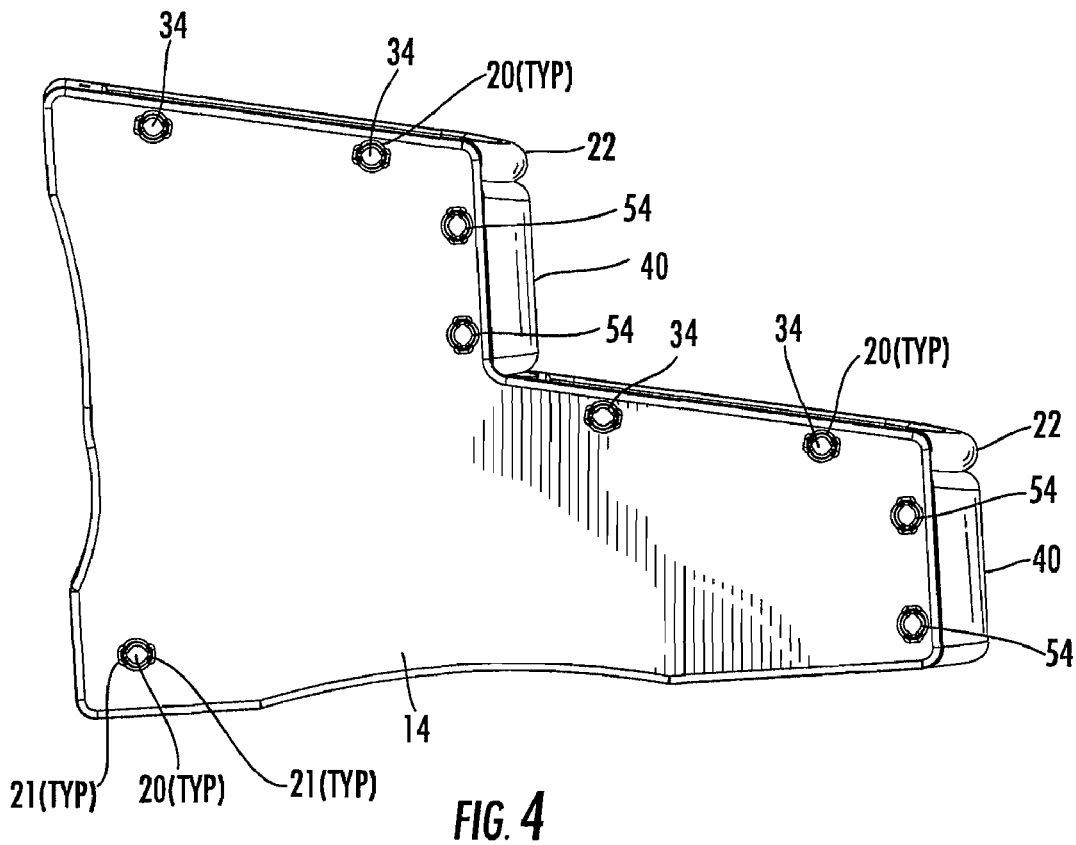
FIG. 4 is a left side elevational view of the step of FIG. 1.

Preferably, as shown in FIG. 2, the back skin 44 of the riser 40 includes stiffening depressions 45 to provide added stiffness to the risers 40. It is envisioned that these stiffening elements, including those formed on the sidewalls and treads, are not limited to being formed as depressions. Similar contours including ribs, protrusions, and other suitable forms may be utilized to accomplish the desired stiffening effect.

While it is preferred that the risers 40 are formed from blow molded polymeric material, those skilled in the art will recognize that the risers 40 can be formed from other suitable materials and/or other construction methods.

Figure 18:
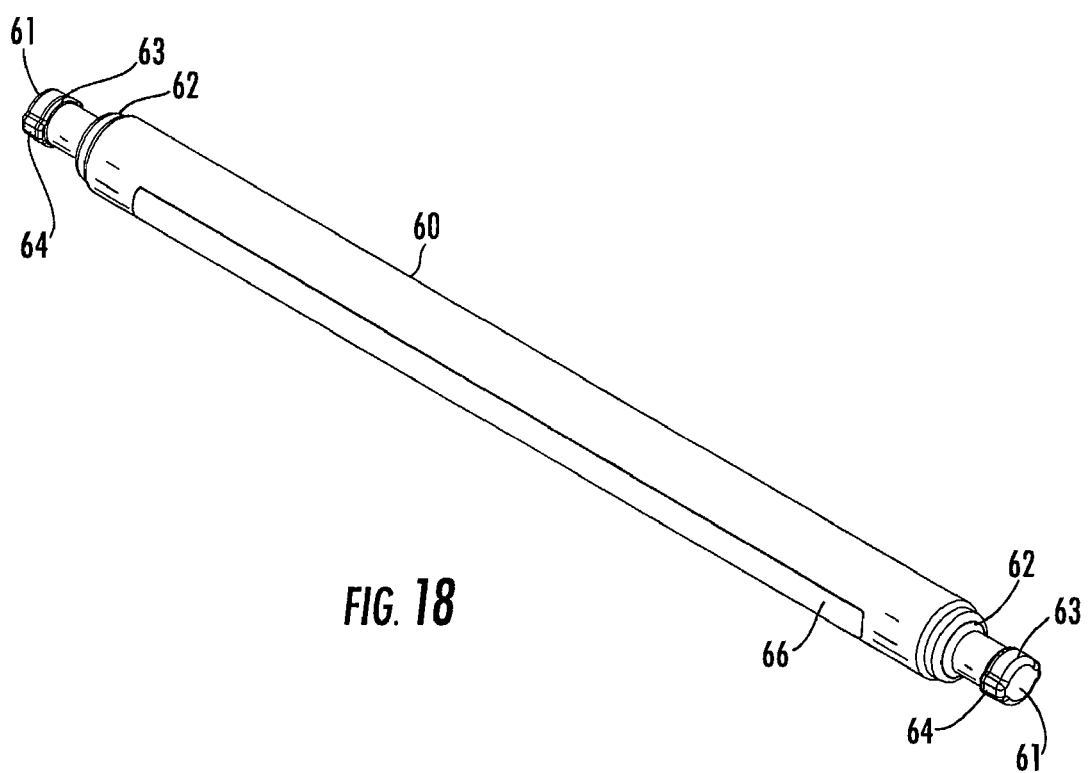
FIG. 18 is a perspective view of a support bar used to assemble the step of FIG. 1.
Figure 19:
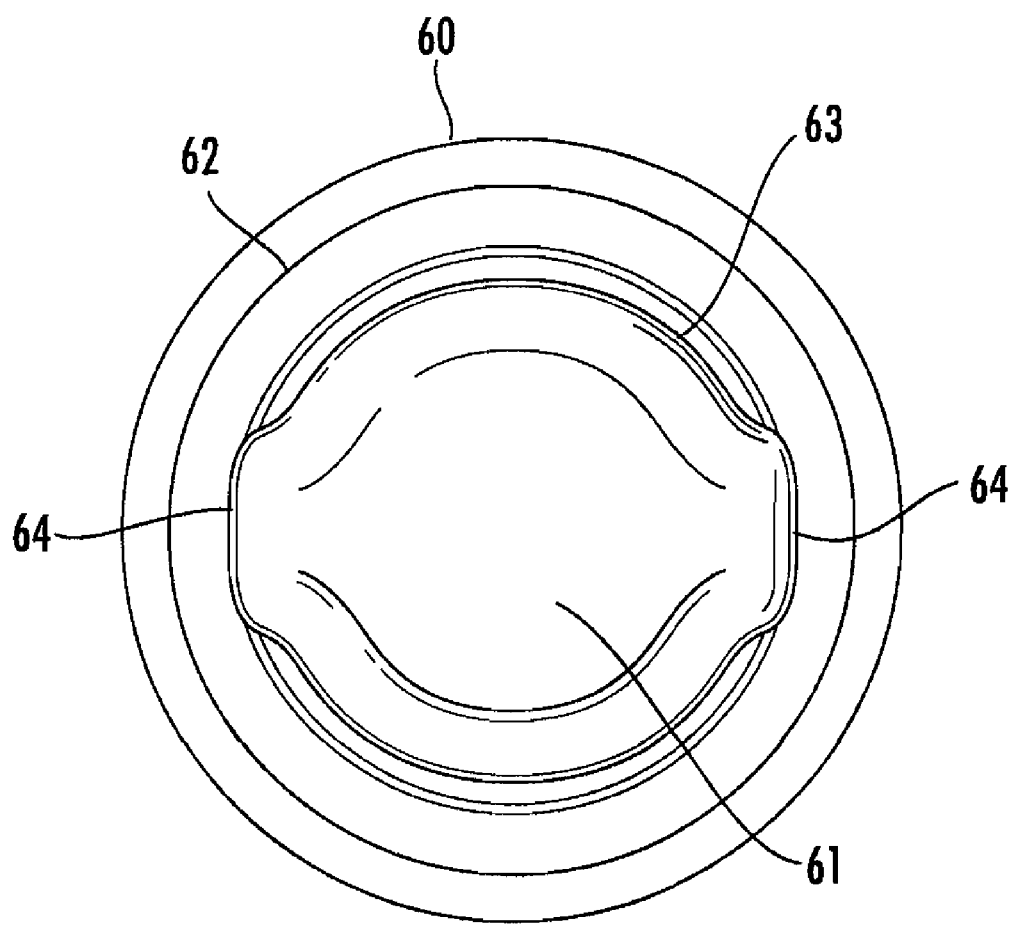
FIG. 19 is an enlarged end view of the support bar of FIG. 18.
Figure 20:
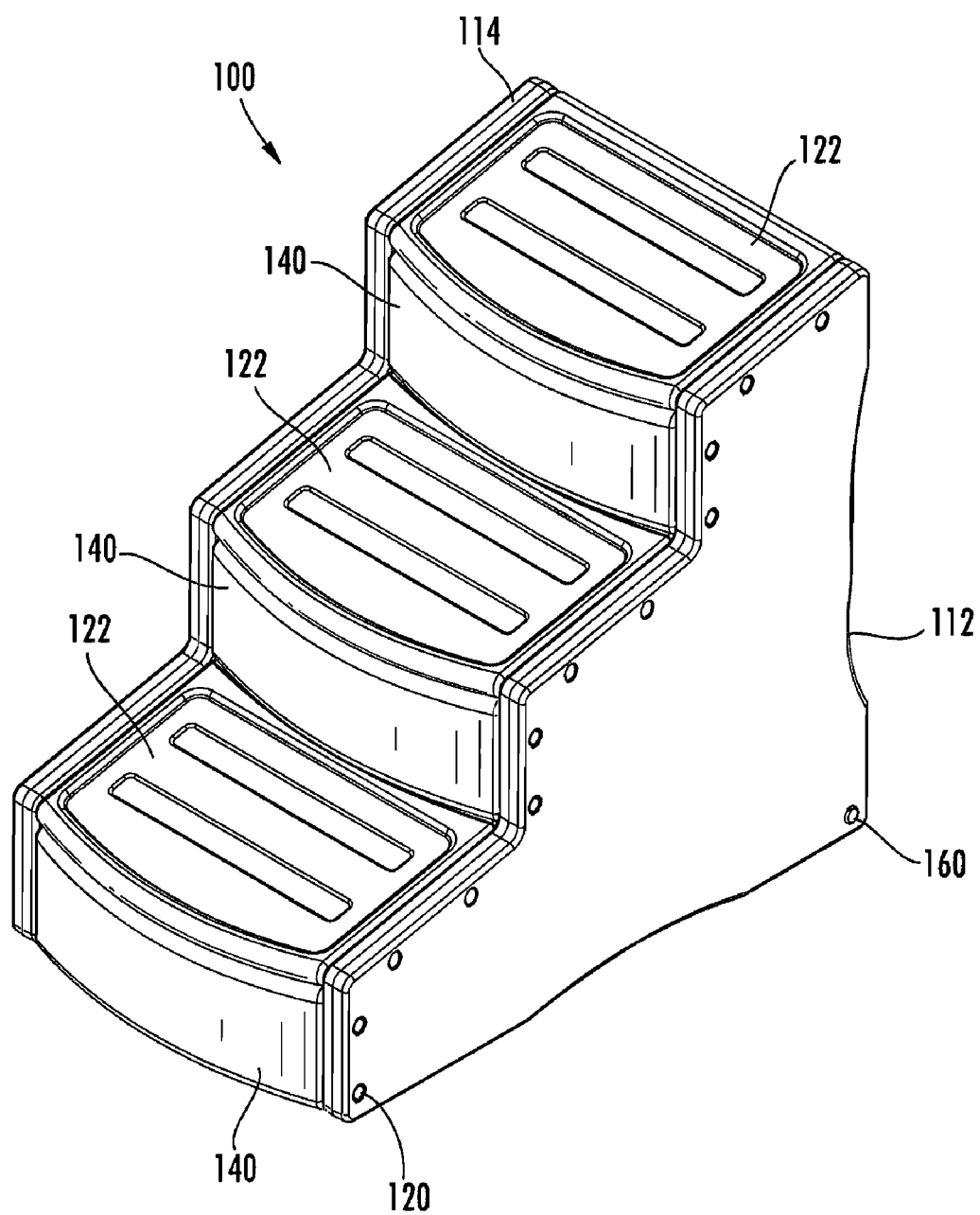
FIG. 20 is a perspective view of a step according to a second embodiment of the present invention.

Referring to FIGS. 18 and 19, the support bar 60 is shown in detail. The support bar 60 preferably includes pegs 61 at each end. The pegs 61 have the same configuration as the pegs 34 and 54 for the treads 22 and risers 40, respectively. This includes the shoulder 62 which is adapted to fit into the circular recess formed by the shoulder 19 of the openings 20 in the inner skin 16 of the sidewalls 12, 14. An enlarged end 63 with tabs 64 is similarly provided for engagement through the openings 20.

Preferably, the support bar 60 is formed from a polymeric material, such as polypropylene, and may include stiffening ribs or recesses 66 which extend longitudinally along the support bar 60 for added stiffness.

In the preferred embodiment, the material used for the treads, sidewalls, risers and support bar is polypropylene having a wall thickness of about 0.1 inches. However, other polymeric or non-polymeric materials could be utilized, and the hollow wall construction is not required, although preferred. Other light-weight solid or sandwiched panel constructions could also be employed.

In order to assemble the portable step 10, preferably sidewalls 12 and 14 are provided along with two of the treads 22, two of the risers 40 and one support bar 60. Preferably, the pegs 34 of each tread 22 are pressed into the corresponding openings 20 of the left sidewall 14 and the pegs 54 of the risers 40 are similarly pressed into the openings 20 of the left sidewall 14. One end of the support bar 60 is similarly inserted into the corresponding opening 20 in the left sidewall 14. The right side wall 12 is then positioned over the pegs 34, 54 and 61 of the treads 22, risers 40 and support bars 60, respectively. By pressing the sidewalls 12, 14, toward one another, the pegs 34, 54, 61 pass through the inner shoulders 19 of the openings 20 and the tabs 37, 57, 64 engage behind the shoulder 19 and are aligned in the recesses 21, visible in the outer skins 15 of the sidewalls 12, 14. The anti-slip material 30, such as pieces of carpet can be applied to the treads 22 using the hook and loop type textile fastening strips 29, 32.

This provides a light weight step which is suitable for use by pets for climbing to and from an elevated surface, with the extended treads which are sloped downwardly providing ease of use and creating less trepidation in the pet as it moves up and down the portable step 10.

Referring now to FIGS. 20-24, a second embodiment of a step 100 in accordance with the present invention is shown. The second embodiment of the step 100 has three treads 122 and three risers 140 located between two sidewalls 112, 114. The second embodiment of the step 100 is similar to the first embodiment of the step 10 in its construction and similar parts have been identified with similar element numbers for ease of reference.

Figure 21:
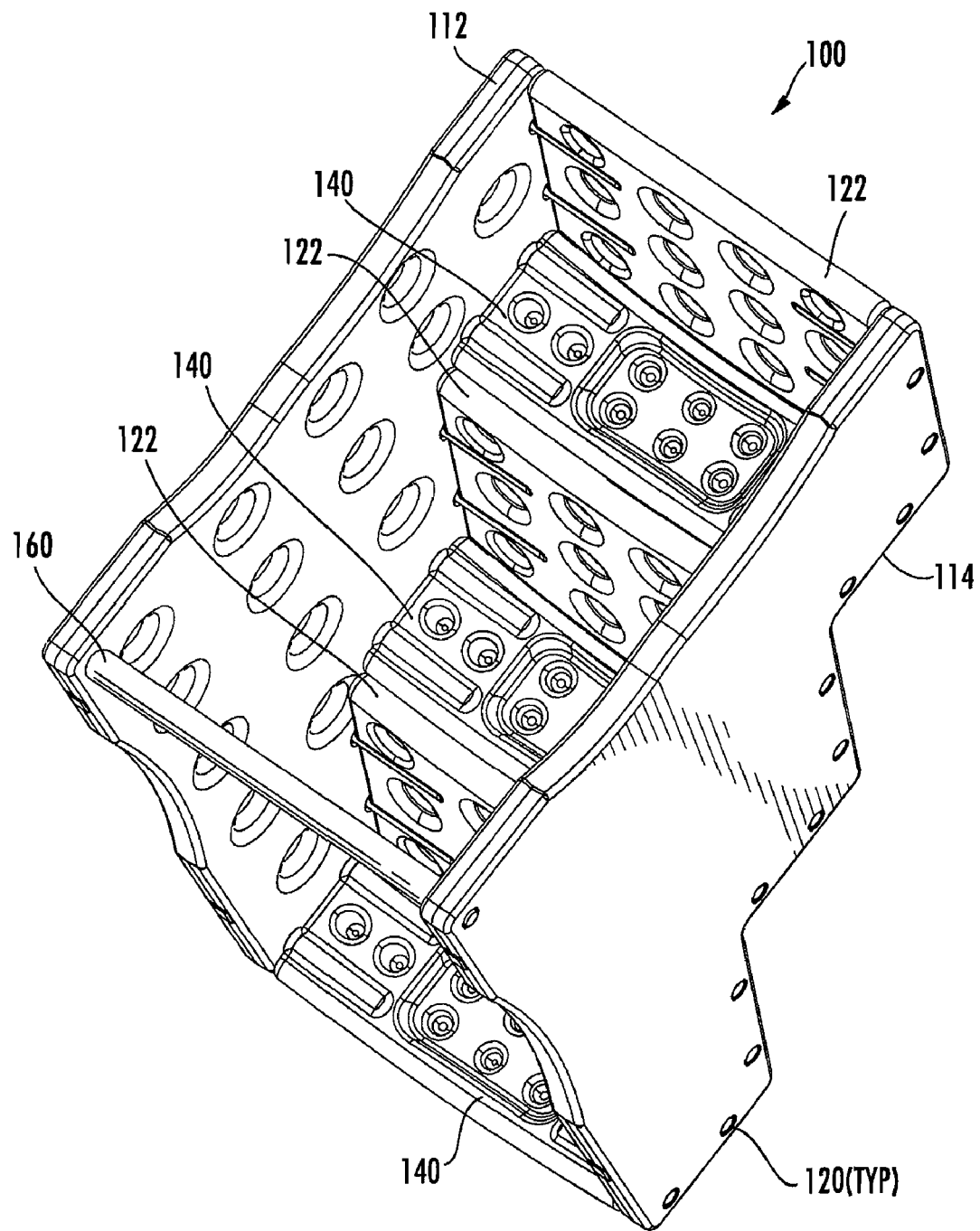
FIG. 21 is a rear-left perspective view of the step of FIG. 20.
Figure 22:
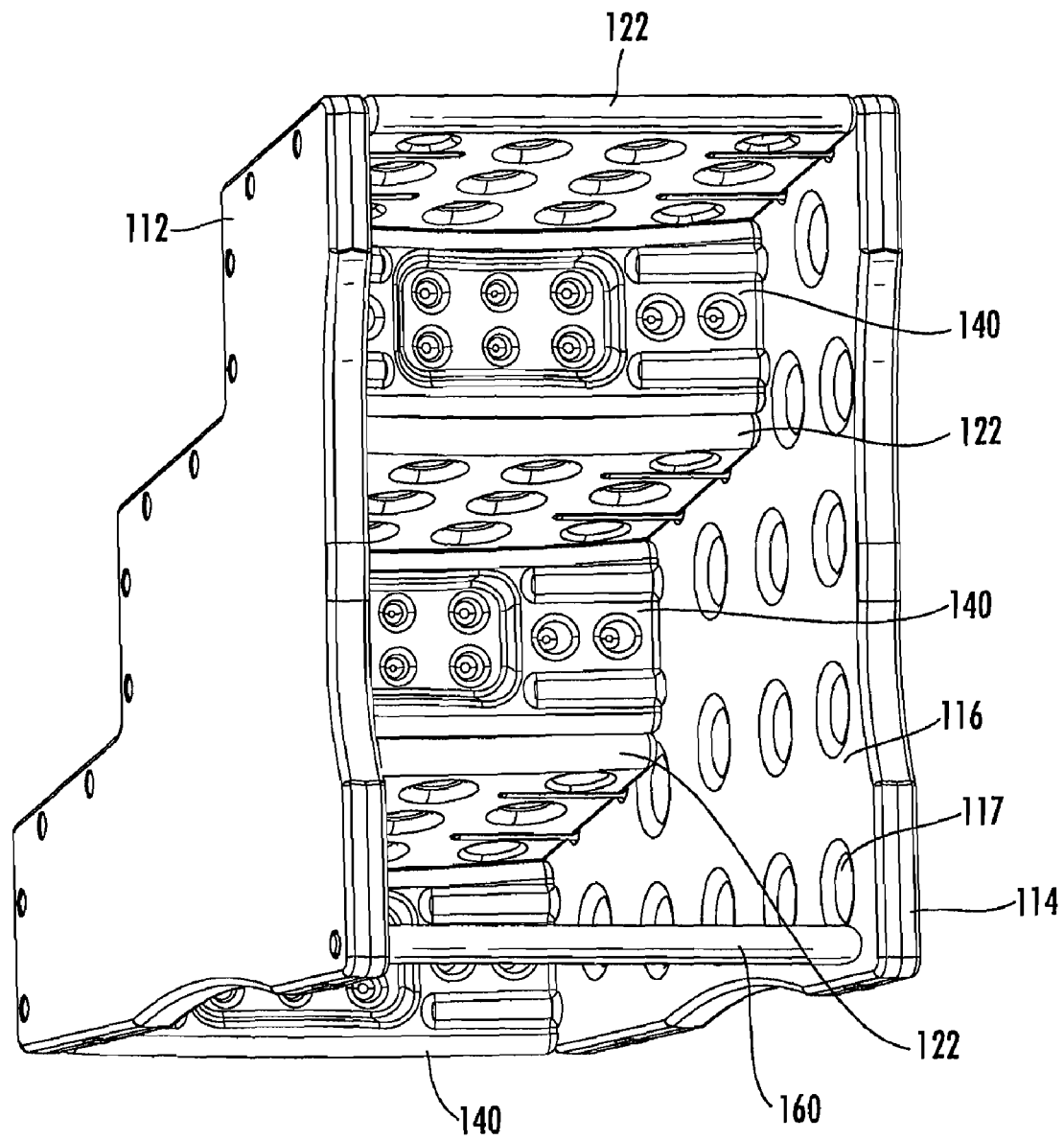
FIG. 22 is a rear-right perspective view of the step of FIG. 20.
Figure 23:
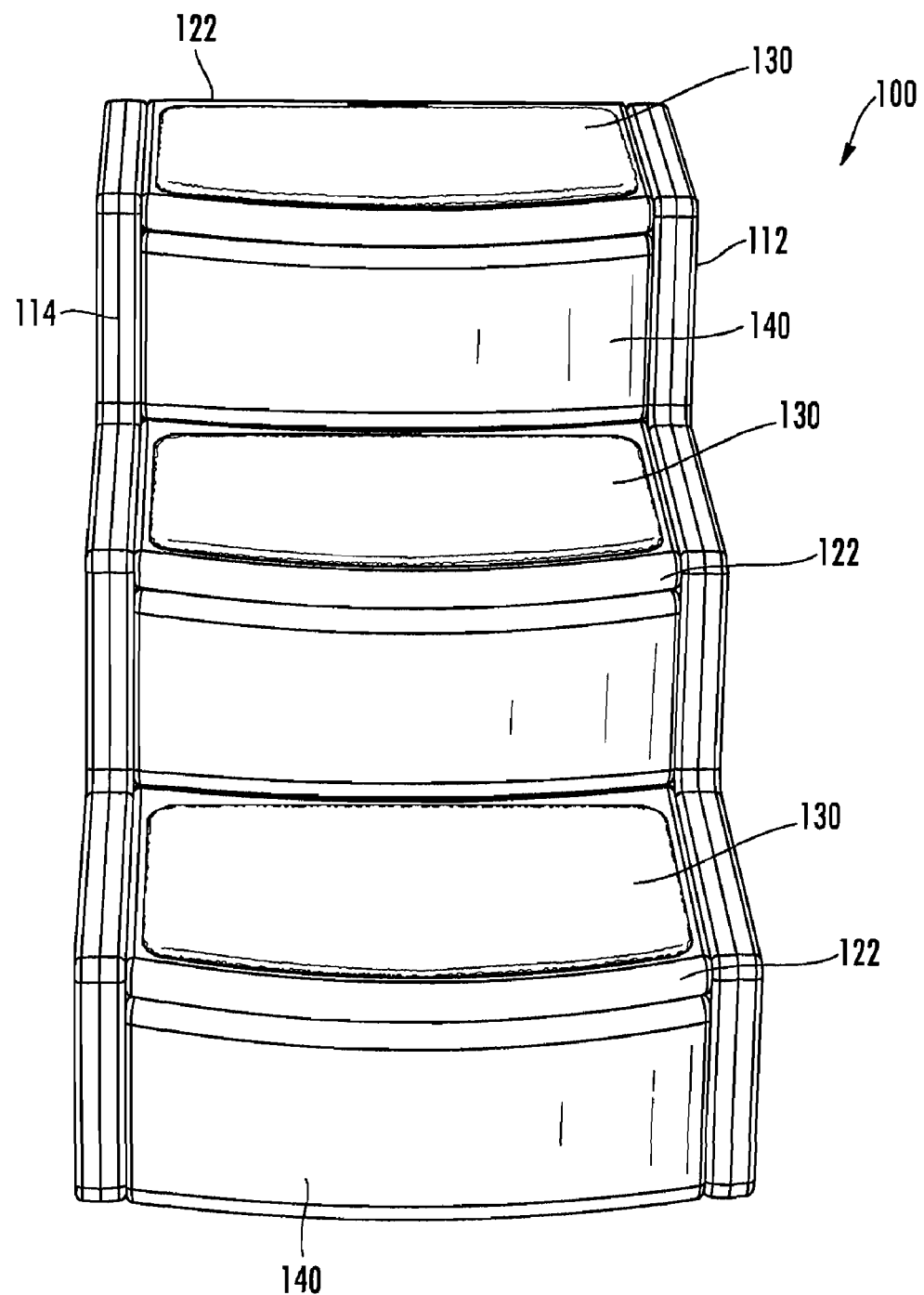
FIG. 23 is a front perspective view of the step of FIG. 20.

FIGS. 21 and 22 show rear perspective views of the step 110 indicating the location of the sidewalls 112, 114, the treads 122, the risers 140 and the support bar 160 connected at the rear bottom corners of the sidewalls 112, 114. As shown, the sidewalls 112, 114, treads 122 and risers 140 are all preferably formed of a polymeric material, preferably by blow molding, and include stiffening depressions in the inner skins which are not apparent in normal use. As shown in FIG. 23, preferably anti-slip material 130, such as pieces of carpeting are affixed to the treads 122, preferably using hook and loop type textile fastening strips 129, shown in FIG. 28 and corresponding strips on the underside of the anti-slip material 130, similar to the strip 32 described above in connection with the first preferred embodiment.

Figure 24:
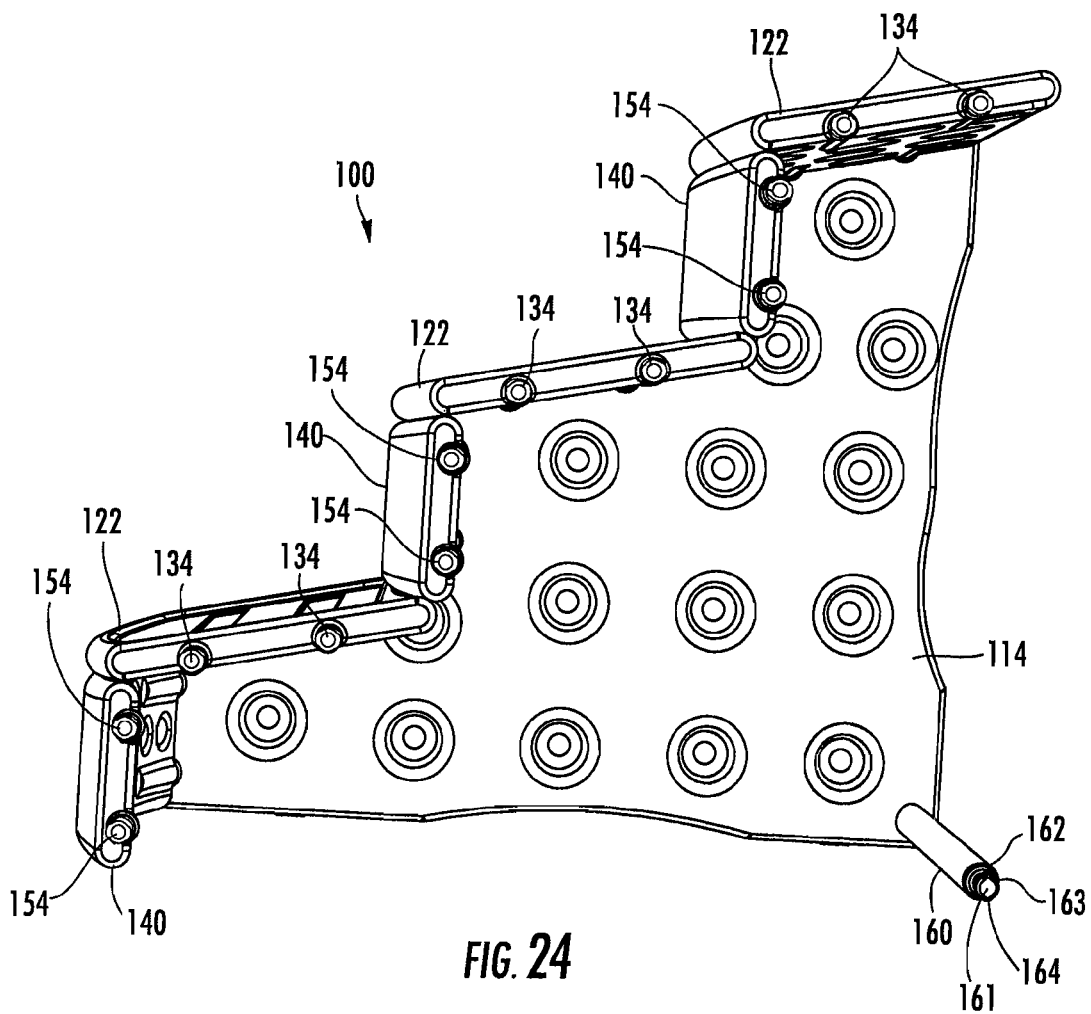
FIG. 24 is a right side elevational view of the partially assembled step according to FIG. 20.

Referring to FIG. 24, a partially assembled right side elevational view of the second embodiment of the step 100 is shown. Specifically, the left sidewall 114 is shown with the treads 122, risers 140 and support bar 160 connected via the respective pegs 134, 154 and 161 inserted in the corresponding openings 120 in the sidewall 114. As discussed above in connection with the first embodiment of the step 10, the right sidewall 112 is then placed over the partially assembled step as shown in FIG. 24 with the upwardly directed pegs 134, 154 and 161 being aligned with the corresponding openings 120 in the right side wall 112, and the assembly is then pressed together such that the pegs 134, 154, 161 extend through the openings 120 and the enlarged diameter ends 136, 156, 163 with the tabs 137, 157 and 164 engage behind the shoulders 119 of the openings.

Figure 25:
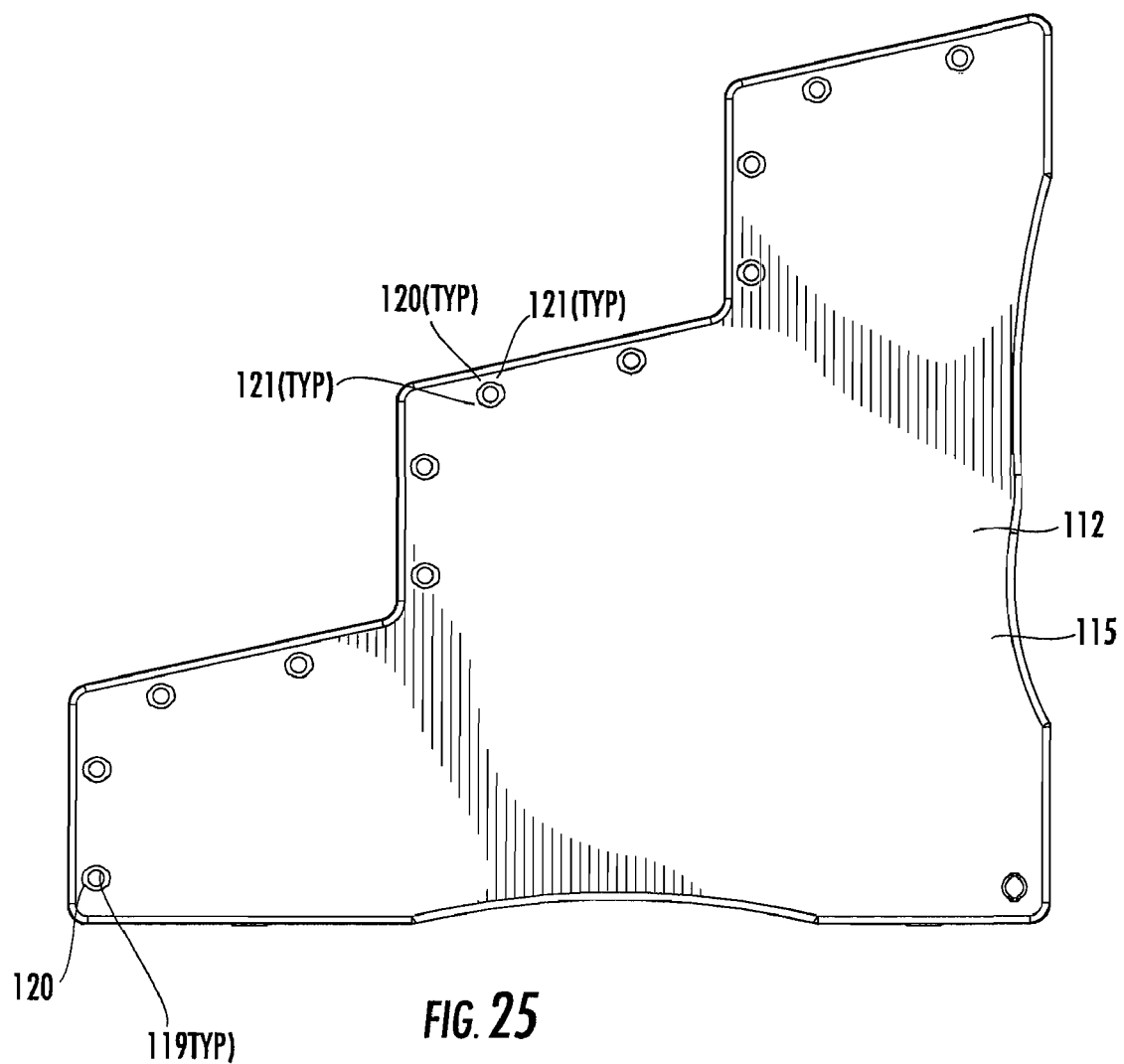
FIG. 25 is a right side elevational view of the right sidewall used to form the step of FIG. 20.
Figure 26:
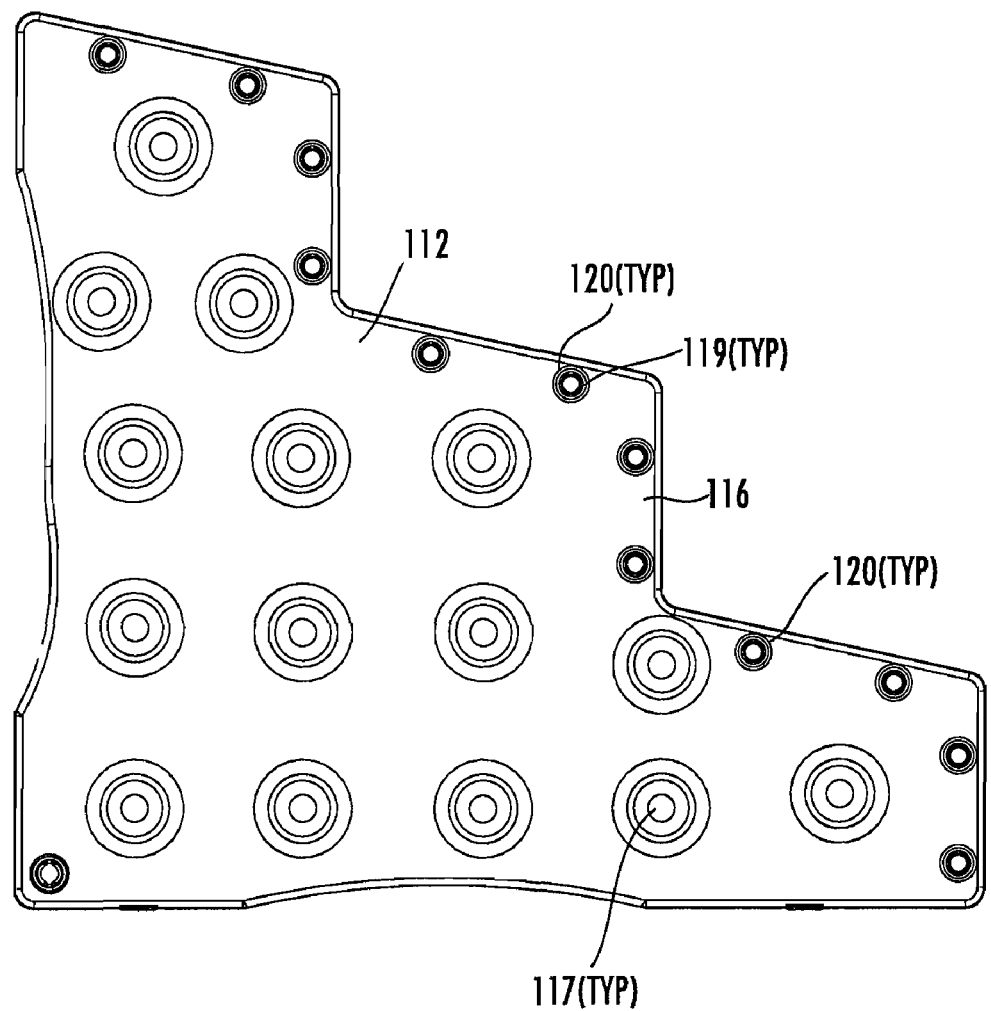
FIG. 26 is an elevational view of the inside skin of the sidewall of FIG. 25.

Referring to FIGS. 25 and 26, the right sidewall 112 is shown in detail with the outer skin 115 shown in FIG. 25 and the inner skin 116 shown in FIG. 26. Stiffening depressions 117 are provided in the inner skin 116 for added stiffness to the sidewall 112. The recesses 121 for the tabs of the pegs are shown in FIG. 25 and the shoulders 119 in the openings 120 are shown most clearly in FIG. 26.

Figure 27:
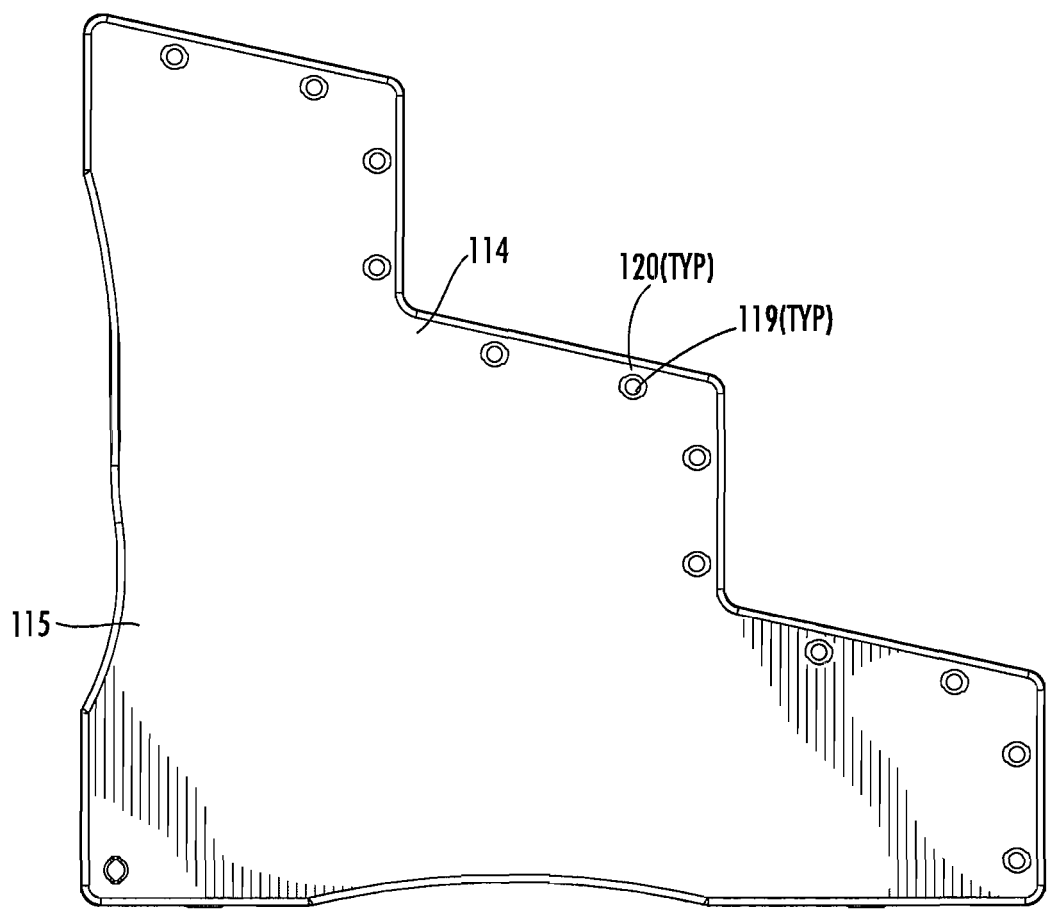
FIG. 27 is a left side elevational view of the left sidewall used to form the step of FIG. 20.

FIG. 27 illustrates the left sidewall 114 with the outer skin 115. The inner skin 116 of the left sidewall 114 is similar to the inner skin 115 of the right sidewall 112, as shown in FIG. 22 as well.

Figure 28:
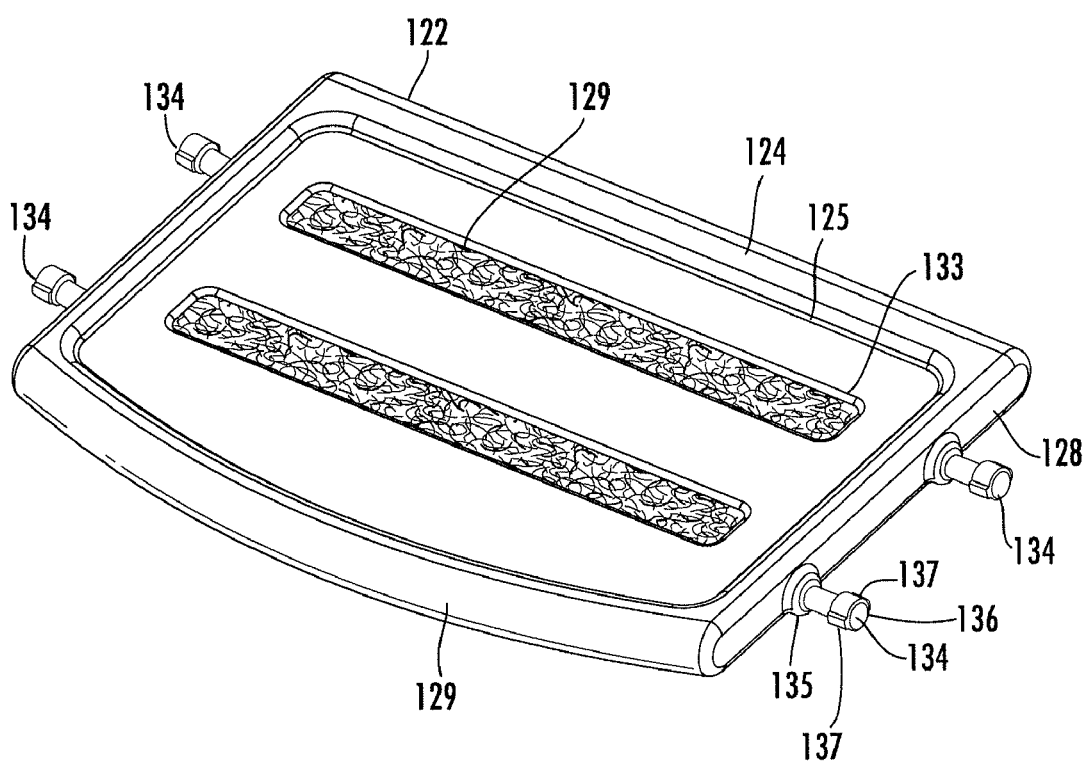
FIG. 28 is a perspective view of the tread used in the step of FIG. 20.
Figure 29:
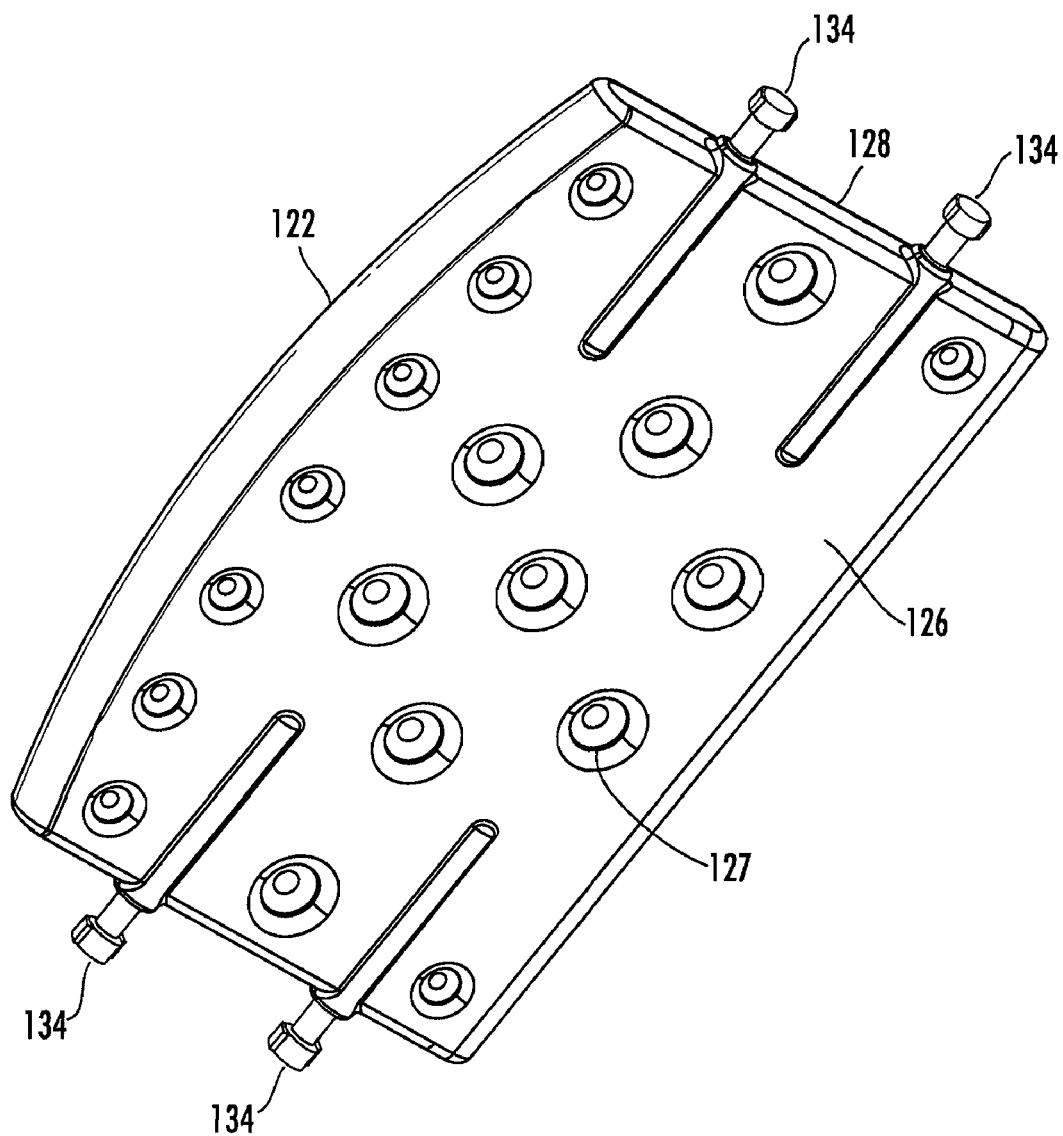
FIG. 29 is a bottom perspective view of the tread of FIG. 28.
Figure 30:
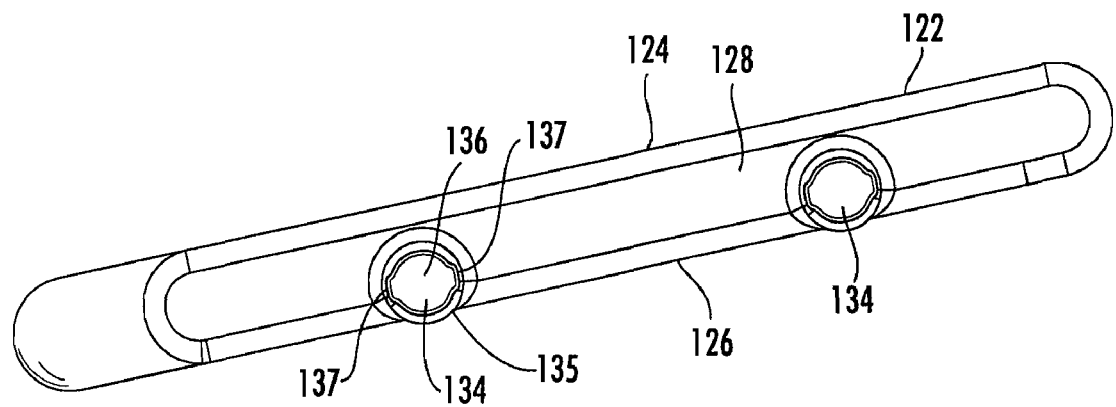
FIG. 30 is a side elevational view of the tread of FIG. 28.

FIGS. 28-30 show the construction of the tread 122 which includes the hook and loop type textile fastening strips 129 located in recesses 133 as well as the recess 125 in the upper skin 124 for the anti-slip material 130. The construction of the pegs 134 with the circular shoulder 135 at the base along with the enlarged diameter end 136 with tabs 137 is also clearly illustrated. The construction of the tread 122 is similar to the tread 22 and preferably the ratios of tread depth to riser height are as discussed above, although in the second preferred embodiment, the tread 122 is only approximately 9 inches deep at the sidewalls as opposed to the tread 22 of the first embodiment of the invention being approximately 11 inches deep at the sidewalls.

The construction of the risers 140 is the same as that of the risers 40 discussed above and accordingly has not been repeated.

Figure 31:
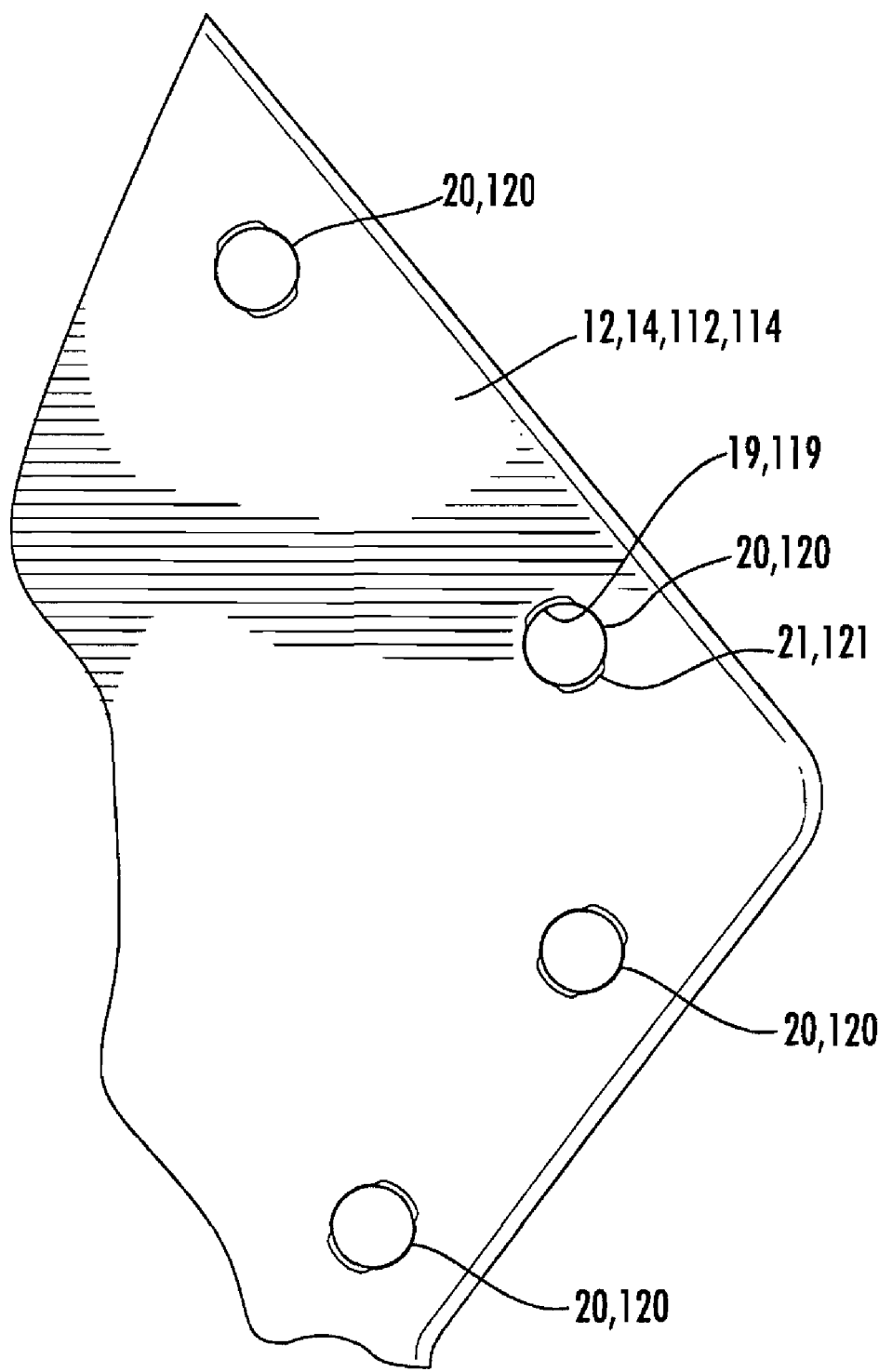
FIG. 31 is an enlarged potion of the sidewall of FIG. 27 showing the formation of the openings used to assemble the steps according to the present invention.
Figure 32:
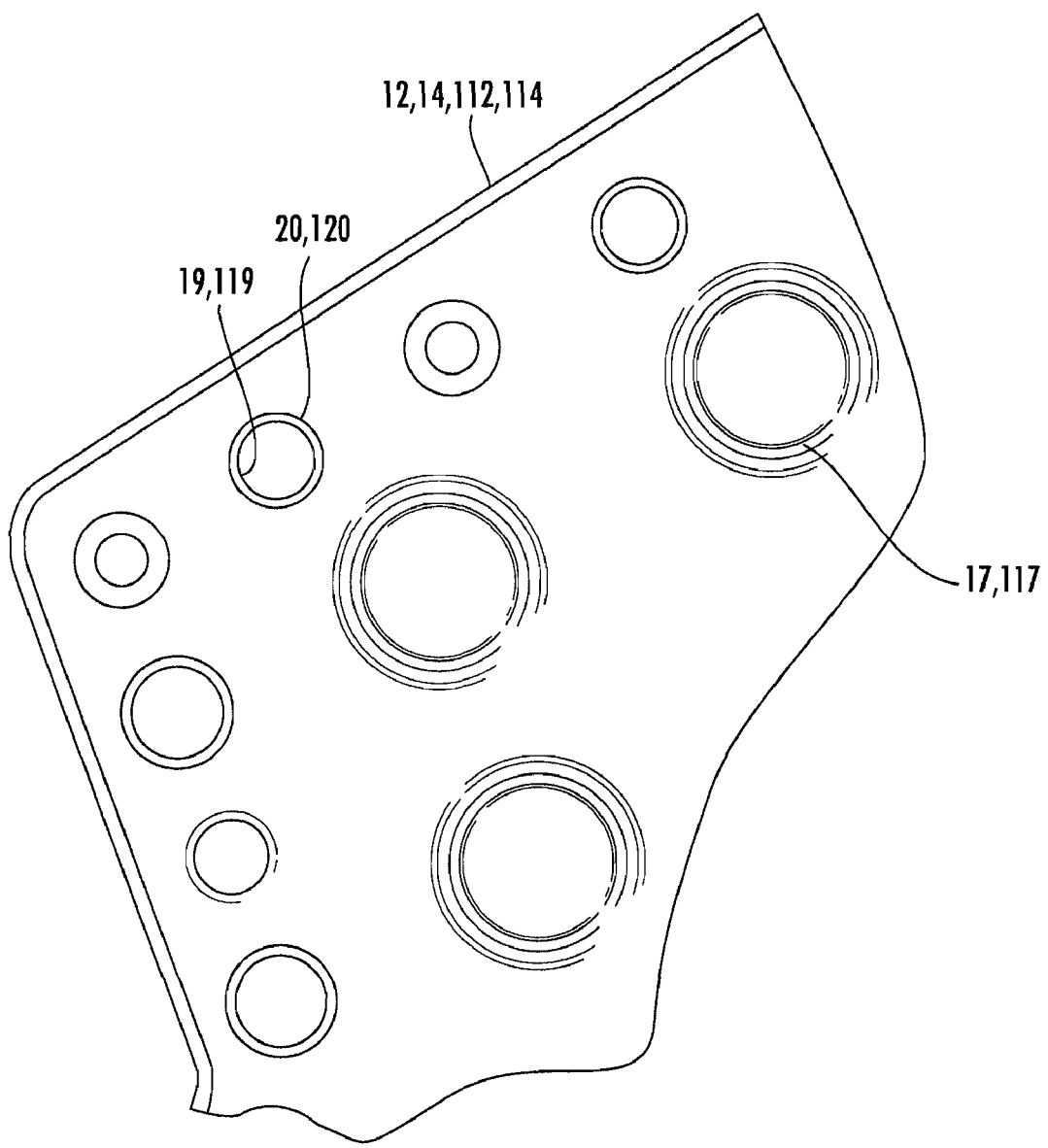
FIG. 32 is an enlarged view of the inner skin section of the sidewall shown in FIG. 31 showing the formation of the openings used to assemble the steps in the present invention.

Referring to FIGS. 31 and 32, an enlarged detail of a portion of a sidewall 12, 14, 112, 114 is shown in the area of an opening 20, 120. FIG. 31 shows the outer skin of the sidewall 12, 14, 112, 114, wherein the shoulder 19, 119 within the opening 20, 120 is clear as well as the recesses 21, 121 for receiving the tabs located at the ends of the pegs 34, 54, 61, 134, 154, 161. Referring to FIG. 32, the inner skin of the sidewalls 12, 14, 112, 114 is illustrated at the opening 20, 120. Here the enlarged diameter of the opening 20 which corresponds to the diameter of the shoulder 35, 55, 63, 135, 155, 163 at the base of the pegs 34, 54, 61, 134, 154, 161 is shown.

In the preferred embodiment, the shoulder 35, 55, 63, 135, 155, 163 at the base of the peg has a diameter of about 0.70 inches and corresponds to the diameter of the opening in the inner skin of the sidewall 12, 14, 112, 114. The shoulder 19, 119 in the opening 20, 120 has an inside diameter of approximately 0.68 inches. The peg has a diameter of approximately 0.62 inches at the intermediate portion and the enlarged diameter end of the peg has a diameter of approximately 0.65 inches. The tabs 37, 57, 64 on the ends of the peg extend to an effective diameter of approximately 0.69 inches. While the approximate dimensions from the preferred embodiments of the steps 10, 100 have been given, those skilled in the art will recognize that other dimensions can be utilized in order to form the connections between the treads, risers, support bars and sidewalls in order to form the steps 10, 100.

Figure 33:
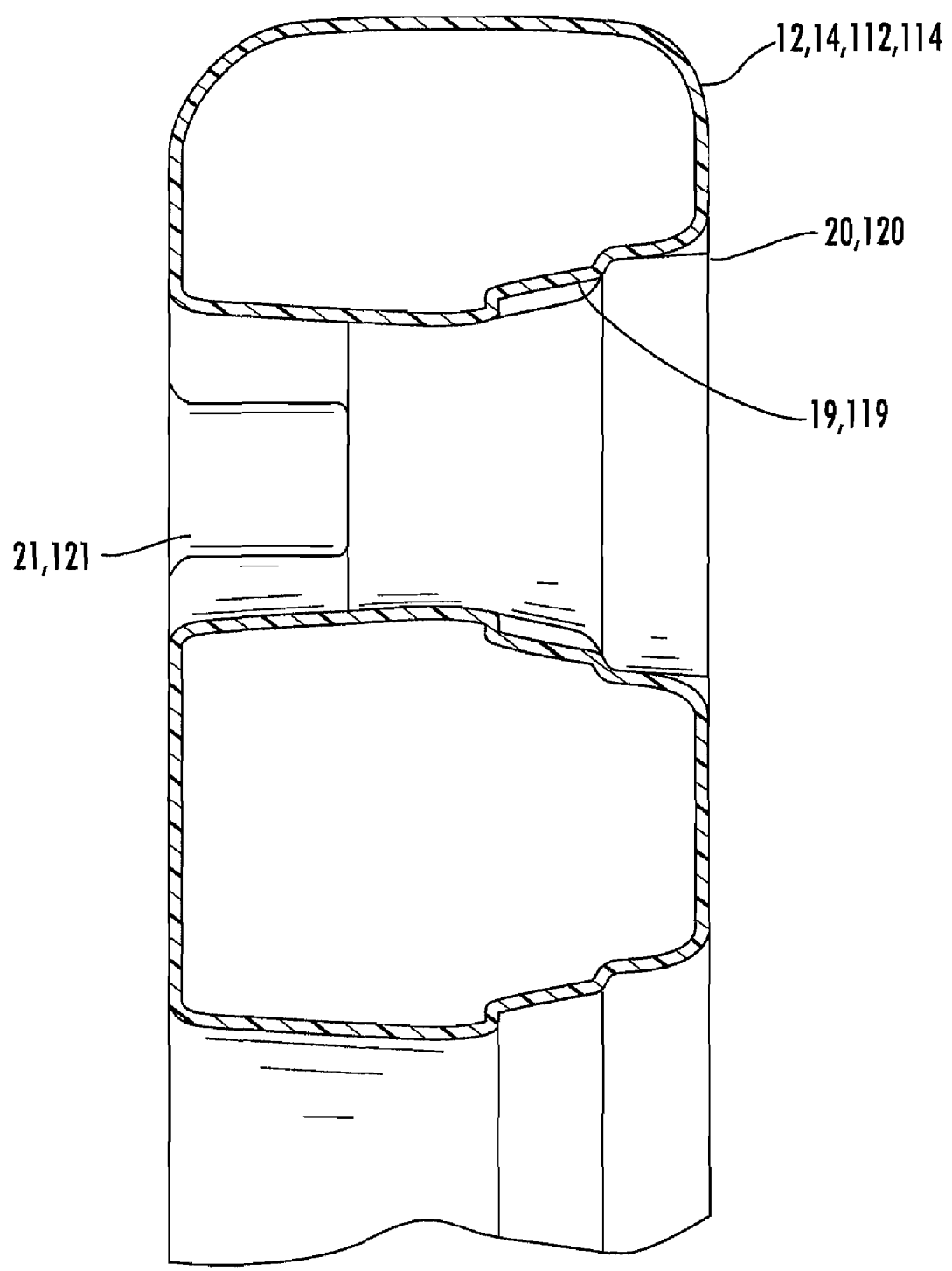
FIG. 33 is an enlarged cross-sectional view through one of the openings in the sidewall.
Figure 34:
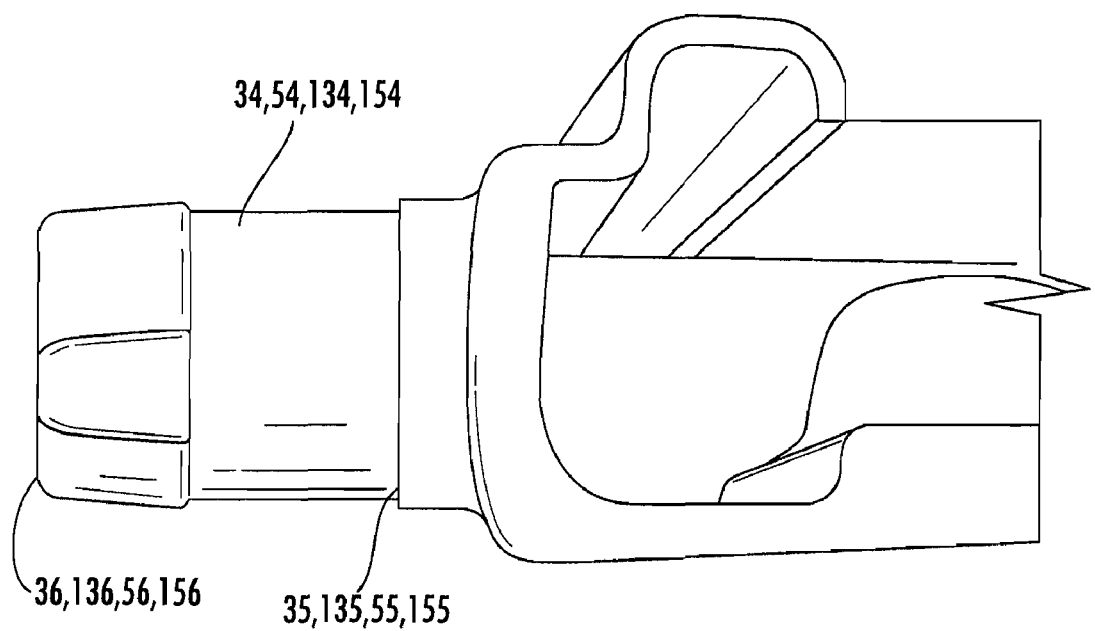
FIG. 34 is an enlarged detail view of a peg on a tread, riser, or support bar.

FIGS. 33 and 34 provide enlarged detail cross-sections of the openings 20, 120 and the pegs 34, 54, 134, 154. The pegs 61, 161 are of the same construction as well.

An advantage of the steps 10, 100 according to the present invention is that the treads and sidewalls are generally flat and can be easily flat packed and the risers are only slightly curved also allowing for generally flat packing for shipping. Due to the hollow wall construction, the steps 10, 100 according to the invention provide exceptional strength while maintaining a light weight that allows not only for lower costs for shipping but also easier handling by the ultimate end user.

Additionally, the peg and opening connection used by the steps 10, 100 according to the invention allow for repeated assembly and disassembly for cleaning and/or storage. The removable anti-slip material 30, 130 is also easily removable for cleaning and/or replacement.

While the preferred embodiments have been described with two or three steps, the invention can be applied to steps having a different number of treads and risers, and for steps of various widths and heights, and the invention is not limited to the two preferred configurations noted above. The present invention is also not limited to a step assembly for use by pets, and combinations described herein may be used with any construction that aids in moving between different heights.

Having thus described in detail several embodiments the present invention, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A portable step assembly comprising:
   first and second sidewalls each having a plurality of openings, a shoulder is formed at a first end of each of the plurality of openings and a recess is formed at a second end of each of the plurality of openings;
   at least one tread having pegs formed on opposite sides thereof in complementary positions to a first set of the openings in each of the sidewalls;
   at least one riser having pegs formed on opposite sides thereof in complementary positions to a second set of the openings in each of the sidewalls,
   the pegs of the at least one tread and the at least one riser are removably insertable into the corresponding one of the first and second sets of openings such that the step has the ability to be assembled and disassembled repeatedly, the pegs each include an enlarged cylindrical shoulder portion adjacent to a base of the at least one tread or the at least one riser, a cylindrical intermediate section, an enlarged end portion and at least one radially protruding tab positioned on the enlarged end portion having a diameter greater than the cylindrical intermediate section.

2. The portable step assembly of claim 1, wherein the shoulder formed at the first end of each of the plurality of openings is configured to receive the enlarged shoulder portions of the pegs, and
   the recess formed at the second end of each of the plurality of openings is configured to receive the at least one tab.

3. The portable step assembly of claim 2, wherein at least one of the enlarged end portions, the enlarged shoulder portions, or the tabs of the pegs create an interference fit with the openings upon insertion.

4. The portable step assembly of claim 1, wherein the at least one tread has an anti-slip material attached to an upward facing surface thereof.

5. The portable step assembly of claim 4, wherein the at least one tread includes a depression formed on the upward facing surface thereof which receives the anti-slip material.

6. The portable step assembly of claim 4, wherein the anti-slip material is removably secured to the at least one tread.

7. The portable step assembly of claim 6, wherein the anti-slip material is removably secured with a hook and loop fastener.

8. The portable step assembly of claim 1, wherein the at least one tread is oriented at a downward angle with respect to horizontal.

9. The portable step assembly of claim 8, wherein the downward angle of the at least one tread is approximately 5 to 15 degrees with respect to horizontal.

10. The portable step assembly of claim 1, wherein both the at least one tread and the at least one riser comprise a generally curved profile on forward facing surfaces thereof.

11. The portable step assembly of claim 1, wherein at least one of the at least one tread, the at least one riser, or the sidewalls includes at least one stiffening element.

12. The portable step assembly of claim 11, wherein the at least one stiffening element comprises a depression formed in an inner skin of at least one of the at least one tread, the at least on riser, or the sidewalls.

13. The portable step assembly of claim 1, further comprising a support bar positioned between the first and second sidewalls at a position spaced apart from the at least one tread and the at least one riser.

14. The portable step assembly of claim 1, wherein the at least one tread comprises two treads and the at least one riser comprises two risers.

15. The portable step assembly of claim 1, wherein the at least one tread comprises three treads and the at least one riser comprises three risers.

16. A method of assembling portable steps comprising:
    providing first and second sidewalls each having a plurality of openings;
    providing at least one tread having pegs formed on opposite first and second sides thereof in complementary positions to a first set of openings in each of the sidewalls;
    providing at least one riser having pegs formed on opposite first and second sides thereof in complementary positions to a second set of the openings in each of the sidewalls;
    providing the pegs with an enlarged cylindrical shoulder portion adjacent to a base of the at least one tread and the at least one riser;

providing a cylindrical intermediate section and an enlarged end portion having a diameter greater than the cylindrical intermediate section on each of the pegs;

providing at least one radially protruding tab positioned on the enlarged end portion of each of the pegs;

providing a shoulder formed at a first end of each of the plurality of openings configured to receive the enlarged shoulder portions of the pegs;

providing at least one recess formed at a second end of each of the plurality of openings configured to receive the at least one tab;

inserting the pegs which are located on the first side of the at least one tread into the first set of openings in the first sidewall;

inserting the pegs which are located on the first side of the at least one riser into the second set of openings in the first sidewall;

inserting the pegs which are located on the second side of the at least one tread into the first set of openings in the second sidewall;

inserting the pegs which are located on the second side of the at least one riser into the second set of openings in the second sidewall;

engaging the enlarged shoulder portions of the pegs into the shoulders of the plurality of openings; and engaging the at least one tab of each of the pegs into the at least one recess of each of the plurality of openings.

17. The method of claim 16, further comprising:

providing a support bar with at least one peg formed on each end thereof; and engaging the at least one peg on each end of the support bar into corresponding openings in the first and second sidewalls.

* * * * *